US012473255B2

(12) United States Patent
Verduyckt et al.

(10) Patent No.: US 12,473,255 B2
(45) Date of Patent: Nov. 18, 2025

(54) PROCESS FOR THE RECOVERY OF EPSILON-CAPROLACTAM FROM NYLON 6-CONTAINING MULTI-COMPONENT MATERIAL

(71) Applicant: HSCC Sustainable Venturing B.V., Urmond (NL)

(72) Inventors: Jasper Verduyckt, Urmond (NL); Jarno Martijn Westerhof, Urmond (NL); Peter Roos, Urmond (NL); Anna Dite Cuiper, Urmond (NL); Kate Emily Murphy, Urmond (NL); Wenjing Fu, Urmond (NL); Johan Thomas Tinge, Urmond (NL)

(73) Assignee: HSCC Sustainable Venturing B.V., Urmond (NL)

(*) Notice: Subject to any disclaimer, the term of this patent is extended or adjusted under 35 U.S.C. 154(b) by 0 days.

(21) Appl. No.: 18/992,408

(22) PCT Filed: Jul. 11, 2023

(86) PCT No.: PCT/EP2023/069235
§ 371 (c)(1),
(2) Date: Jan. 8, 2025

(87) PCT Pub. No.: WO2024/013196
PCT Pub. Date: Jan. 18, 2024

(65) Prior Publication Data
US 2025/0263369 A1 Aug. 21, 2025

(30) Foreign Application Priority Data
Jul. 11, 2022 (EP) .................................... 22184113

(51) Int. Cl.
| C07D 201/12 | (2006.01) |
| C07D 201/16 | (2006.01) |
| C07D 223/10 | (2006.01) |
| C08G 69/14 | (2006.01) |
| C08J 11/14 | (2006.01) |

(52) U.S. Cl.
CPC ......... *C07D 201/12* (2013.01); *C07D 201/16* (2013.01); *C08G 69/14* (2013.01); *C08J 11/14* (2013.01); *C08J 2377/02* (2013.01)

(58) Field of Classification Search
CPC ... C07D 201/12; C07D 201/16; C07D 223/10
See application file for complete search history.

(56) References Cited

U.S. PATENT DOCUMENTS

| 5,169,870 A | 12/1992 | Corbin et al. |
| 5,233,037 A | 8/1993 | Nielinger et al. |
| 5,700,358 A | 12/1997 | Fuchs et al. |
| 5,869,654 A | 2/1999 | Sifniades et al. |
| 5,929,234 A | 7/1999 | Sifniades et al. |
| 5,948,908 A | 9/1999 | Sifniades et al. |
| 5,977,193 A | 11/1999 | Corbin et al. |
| 5,990,306 A | 11/1999 | Mayer et al. |
| 6,448,395 B1 | 9/2002 | Simons et al. |
| 2002/0038022 A1 | 3/2002 | Agterberg et al. |
| 2014/0255255 A1 | 9/2014 | Heilberg |
| 2024/0092991 A1 | 3/2024 | Titcomb et al. |

FOREIGN PATENT DOCUMENTS

| CN | 1196048 A | 10/1998 |
| CN | 1278792 A | 1/2001 |
| CN | 1332158 A | 1/2002 |
| CN | 1793124 A | 6/2006 |
| CN | 103467378 A | 12/2013 |
| CN | 107418198 A | 12/2017 |
| CN | 116261581 A | 6/2023 |
| DE | 4211609 A1 | 3/1993 |
| DE | 10048824 A1 | 4/2002 |
| EP | 603434 A1 | 6/1994 |
| EP | 627417 A1 | 12/1994 |
| EP | 670 308 A1 | 9/1995 |
| EP | 1 173 419 A1 | 1/2002 |
| GB | 1157416 A | 7/1969 |
| GB | 2085432 A | 4/1982 |
| JP | H0848666 A | 2/1996 |
| JP | H10298162 A | 11/1998 |
| JP | 2000038471 A | 2/2000 |
| JP | 2000178249 A | 6/2000 |
| JP | 2001294571 A | 10/2001 |
| JP | 2007009645 A | 1/2007 |
| JP | 2007099645 A | 4/2007 |
| JP | 2008031127 A | 2/2008 |

(Continued)

OTHER PUBLICATIONS

Dmitrieva, L.A. et al.: "Regeneration of Epsilon-Caprolactam From Wastes in the Manufacture of Polycaproamide Fibres and Yarns", Fibre Chemistry, vol. 17, No. 4, 1985, pp. 229-241, XP000647320, ISSN: 0015-0541, DOI: 10.1007/BF00545638 cited in the application the whole document.
WIPO. International Search Report relating to application No. PCT/EP2023/069235, dated Aug. 7, 2023.
International Search Report and Written Opinion issued in related PCT Application No. PCT/EP2023/052067, dated Apr. 11, 2023.
Tinge et al. (2018). Caprolactam. In Ullmann's Encyclopedia of Industrial Chemistry. May 25, 2018. https://doi.org/10.1002/14356007.a05_031.pub3.
Herzog et al. (2013). Polyamides. In Ullmann's Encyclopedia of Industrial Chemistry, (Ed.). Jan. 15, 2013. https://doi.org/10.1002/14356007.a21_179.pub3.

(Continued)

*Primary Examiner* — Bruck Kifle
(74) *Attorney, Agent, or Firm* — Honigman LLP

(57) ABSTRACT

The application provides a process for recovering purified ε-caprolactam from nylon 6-containing multi-component material which comprises the steps of a) providing a preconcentrated nylon 6-containing material obtained by extraction, b) depolymerization, c) recovery, and d) purification that comprises extraction, back-extraction, distillation and crystallization.

20 Claims, 4 Drawing Sheets

(56) References Cited

FOREIGN PATENT DOCUMENTS

| JP | 2008031128 A | 2/2008 |
|---|---|---|
| JP | 2008031388 A | 2/2008 |
| JP | 2008179816 A | 8/2008 |
| JP | 2008239985 A | 10/2008 |
| JP | 2011088943 A | 5/2011 |
| KR | 20110068001 A | 6/2011 |
| WO | 97/03048 A1 | 1/1997 |
| WO | 9720813 A1 | 6/1997 |
| WO | 9911616 A1 | 3/1999 |
| WO | 2021021031 A1 | 2/2021 |
| WO | 2022/115602 A1 | 6/2022 |
| WO | 2022/129022 A1 | 6/2022 |

OTHER PUBLICATIONS

A. A. Ogale, "Depolymerization of Nylon 6: Some Kinetic Modeling Aspects", Journal of Applied Polymer Science, vol. 29, 1984, pp. 3947-3954, https://doi.org/10.1002/app.1984.070291227.

Synowiec et al. "Industrial Purification of Caprolactam by Means of Crystallization from Aqueous Solutions", Crystal Research and Technology, vol. 18, No. 7, Jan. 1, 1983 (Jan. 1, 1983), pp. 951-957.

International Search Report and Written Opinion issued in related PCT Application No. PCT/EP2023/052071, dated May 4, 2023.

International Search Report and Written Opinion issued in related PCT Application No. PCT/EP2023/052069, dated Apr. 11, 2023.

Office Action issued in related Korean Patent Application No. 10-2024-7028713, dated Dec. 12, 2024.

Gong Caihong et al: "Simple process for separation and recycling of nylon 6 and polyurethane components from waste nylon 6/polyurethane debris", Textile Research Journal, vol. 91, No. 1-2 Jun. 17, 2020 (Jun. 17, 2020), pp. 18-27, XP093006676, GB ISSN: 0040-5175, DOI: 10.1177/0040517520931893 Retrieved from the Internet: URL:http://journals.sagepub.com/doi/full-x ml/10.1177/0040517520931893 Title, Abstract, Scheme 1, p. 19, right, lines 11-13 and lines 17-18, Figure 4 (IR) for nylon and Figure 6 (NMR) for the urethane, p. 23, right, lines 37-39.

Yin Yunjie et al: "Removal of spandex from nylon/spandex blended fabrics by selective polymer degradation", Textile Research Journal vol. 84, No. 1 May 21, 2013 (May 21, 2013), pp. 16-27, XP093006635, GB ISSN: 0040-5175, DOI: 10.1177/0040517513487790 Retrieved from the Internet: URL:http://journals.sagepub.com/doi/full-xml/10.1177/0040517513487790p17, left, lines 14-18.

International Search Report and Written Opinion issued in related PCT Application No. PCT/EP2023/069236, dated Sep. 12, 2023.

Office Action issued in related Chinese Patent Application No. 202380019025.3, dated May 20, 2025.

U.S. Appl. No. 18/832,297, filed Jul. 23, 2024, Jasper Verduyckt et al.

U.S. Appl. No. 18/832,305, filed Jul. 23, 2024, Jasper Verduyckt et al.

U.S. Appl. No. 18/992,440, filed Jan. 8, 2025, Jasper Verduyckt et al.

U.S. Appl. No. 18/832,315, filed Jul. 23, 2024, Jasper Verduyckt et al.

Office Action issued in related Chinese Application No. 202380019033.8, dated Mar. 3, 2025.

PROCESS FOR THE RECOVERY OF EPSILON-CAPROLACTAM FROM NYLON 6-CONTAINING MULTI-COMPONENT MATERIAL

CROSS-REFERENCE TO RELATED APPLICATIONS

This application is a national phase entry of PCT Application No. PCT/EP2023/069235 filed on Jul. 11, 2023, which claims the benefit of, and priority to, European Patent Application No. EP 22184113.3, filed on Jul. 11, 2022. The disclosures of those priority applications are incorporated by reference herein in their entireties.

TECHNICAL FIELD OF THE INVENTION

The present invention relates to a process for the recovery of ε-caprolactam from material derived from nylon 6-containing multi-component material, in particular multi-layered film. More particularly, the present invention relates to a process for the recovery of ε-caprolactam from material derived from nylon 6-containing multi-component material, whereby high quality ε-caprolactam is obtained. Further, the invention relates to a plant configured to carry out the process of the invention and to the recovered ε-caprolactam obtainable by the process of the invention.

BACKGROUND OF THE INVENTION

In 1938, Paul Schlack invented nylon 6 (CAS Number: 25038-54-4), also known as polyamide 6, PA6, N6, polycaprolactam, poly(hexano-6-lactam), poly(6-aminohexanoic acid), poly(hexamethylene adipamide) or poly[imino(1-oxohexane-1,6-diyl)].

Generally, nylon 6 is synthesized by ring-opening polymerization of ε-caprolactam at a temperature of about 260° C. in an inert atmosphere:

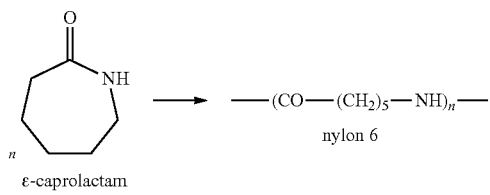

Processes for the production of virgin ε-caprolactam are described in, e.g., Chapter "Caprolactam", in Ullmann's Encyclopedia of Industrial Chemistry (May 25, 2018), Wiley-VCH Verlag GmbH & Co. KGaA, Weinheim, Germany, electronically available via https://doi.org/10.1002/14356007.a05_031.pub3.

Processes for the production of nylon 6 are described in, e.g., Chapter "Polyamides", in Ullmann's Encyclopedia of Industrial Chemistry (Jan. 15, 2013), Wiley-VCH Verlag GmbH & Co. KGaA, Weinheim, Germany, electronically available via https://doi.org/10.1002/14356007.a21_179.pub3.

Nowadays, nylon 6 is worldwide the most produced synthetic polyamide and has a variety of favorable properties for industrial applications, including high mechanical strength, in particular stiffness, hardness and toughness, good electrical insulating properties, good dyeability, good processability, good UV light protection, good fatigue resistance and good barrier functions for gases, aromas, hydrocarbon solvents and low polarity aroma substances from food. This favorable set of properties is the reason why nylon 6 is used intensively in very different industries such as building and construction, consumer goods, electronics and electricals, transportation and packaging. A disadvantage of the use of nylon 6, however, is that it is more expensive than the polyolefins polyethylene and polypropylene. Polyolefins, in turn, have the disadvantage that they are more limited in their industrial applicability due to their poor gas barrier functions, their low temperature resistance and their difficult bonding properties.

As a result, nylon 6 is extensively used as a component in multi-component materials, in most cases in combination with polyolefins. Particularly relevant nylon 6-containing multi-component materials are, e.g., flexible modified atmosphere or controlled atmosphere packaging films which are usually employed to maintain a certain atmosphere inside food-containing packages to improve the shelf life of the packaged products. The majority of today's packaging films are multi-layer films, which typically comprise from two to 15, but can also comprise many more layers. An example of an 11-layer co-extruded cast film is the following: nylon 6/TIE/PE(1)/TIE/nylon 6/EVOH/PA/TIE/PE(2)/PE(3)/PE(4) wherein TIE is a tie layer, EVOH is ethylene vinyl alcohol, PA is a polyamide other than nylon 6, and PE(1), PE(2), PE(3) and PE(4) are different grades of polyethylene. The typical purpose of using nylon 6 in such multi-component materials is to confer mechanical strength and puncture resistance properties and/or barrier properties to restrict gas exchange and loss of aromas. Nylon 6-containing multi-layer films in particular allow maintaining an optimized modified atmosphere inside the package, especially a certain oxygen concentration which is key, for example, to preserve the freshness of fresh products for a longer period of time. The use of multi-layer films can enable cost reductions since cheaper polymers can partially replace the more expensive polymers such as nylon 6. Nylon 6 is also an excellent substitute for aluminum and other metal films.

Multi-component materials comprising more than one (polymer) component are attractive for industrial applications because, e.g., alternative layering of two (or more) different components is a way to obtain composite materials with new properties compared to the pure components. The combination of several layers of different materials can, e.g., improve the mechanical and physical properties of films including puncture, tear and heat resistance as well as moisture and gas (in particular oxygen) barrier properties. Since it is possible to monitor continuously how the properties of the multi-component material change upon altering the employed components and the thickness of the employed component layers, new composite materials with desired properties can be developed relatively easily.

In multi-component materials, in particular multi-layer films, polyolefin layers are often combined with layers made up of polar polymers, like nylon 6, nylon 66, EVOH (ethylene vinyl alcohol) or PVDC (polyvinylidene chloride). In addition, tie layers comprising special adhesive polymers or tie resins (e.g., polyurethanes and acid/anhydride grafted polyolefins) are typically required as intermediate layers between two dissimilar components that do not adhere well. As explained above, use of nylon 6 in multi-component materials has become very common to improve the mechanical and gas barrier properties of such materials. Another important reason, why nylon 6 is often combined with other materials is the cost saving on the rather costly nylon 6.

Environmental concerns regarding the production and the usage of these multi-component nylon 6-containing materials relate to the in-process and the post-consumer generated wastes. These concerns could be mitigated by recycling individual components, such as nylon 6, from multi-component materials that are no longer used or disposed. As packaging materials, nylon 6-containing multi-layer films are a particularly relevant source of waste. These often contain nylon 6 in significant amounts. Thus, if a feasible process existed for recovering nylon 6 from these composite waste materials, this would not only benefit the environment, but also present an economically valuable new source of nylon 6.

The same applies for in-process wastes generated in processes using nylon 6, in particular film production processes. For a limited number of applications, these wastes can be recovered and reused as regrind. However, the optical and mechanical properties of the material are negatively impacted by the regrind, and further deterioration occurs every time the cycle of reuse and processing is repeated. As a result, the cycle of reuse and processing cannot be repeated as often as desired.

In addition, nylon 6 that is recycled according to currently existing methods is generally not rated as "food grade plastic", which limits the applications to a large extent.

Mechanical recycling (a.k.a. material recycling or back-to-plastics recycling) refers to operations that aim to recover plastics via mechanical processes (grinding, washing, separating, drying, re-granulating and compounding), thus producing recyclates that can be converted into plastics products, substituting virgin plastics. Currently, most virgin plastics are produced from a petrochemical feedstock, such as natural gas, coal or crude oil, which has never been used or processed before. In mechanical recycling processes, the polymer chain remains more or less intact. Mechanical recycling is a form of downcycling of the waste because the recycled material is of lower quality and functionality than the original material.

Depolymerization or chemical recycling is a technology in which the polymer is converted into its monomer components (ε-caprolactam in case the polymer is nylon 6). The specifications of the recovered monomer determines whether it can substitute virgin monomers for all or just a limited amount of applications. Virgin monomers are produced from a petrochemical feedstock, such as natural gas, coal or crude oil, which has never been used or processed before.

Next to mechanical recycling of nylon 6-comprising materials, processes for depolymerizing nylon 6 to its valuable monomer, ε-caprolactam, have been developed. These typically use nylon 6 plastic articles as starting materials, that are produced, for example, by injection moulding, extrusion, spinning or other processing steps.

Depolymerization of nylon 6 into ε-caprolactam is the reverse reaction of the ring-opening polymerization of ε-caprolactam:

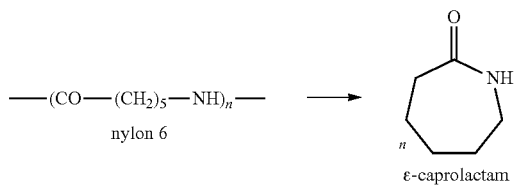

Processes for depolymerization of nylon 6 are known. Such processes might be operated in a batch-wise operated mode, in a semi-continuous mode (in general with batch-wise (re)charging of nylon 6 to the depolymerization reactor) or in a continuous mode.

L. A. Dmitrieva, A. A. Speranskii, S. A. Krasavin and Y N. Bychkov, "Regeneration of ε-Caprolactam From Wastes In the Manufacture of Polycaproamide Fibres and Yarns", Fibre Chemistry, pp. 229-241, March 1986, (translated from Khimicheskie Volokna, No. 4, pp. 5-12, July-August, 1985) is a literature review describing processes for depolymerizing nylon 6 with and without using a catalyst.

A. A. Ogale, "Depolymerization of Nylon 6: Some Kinetic Modeling Aspects", Journal of Applied Polymer Science, vol. 29, 1984, pp. 3947-3954, electronically available via https://doi.org/10.1002/app.1984.070291227 is a paper describing the depolymerization kinetics of nylon 6.

Generally, the prior art of chemical regeneration or recycling processes that depolymerize essentially pure nylon 6 into ε-caprolactam monomers comprise a hydrolytic degradation step at elevated temperature in the presence of water and a reclaiming step of the formed monomer by steam distillation. The hydrolytic degradation step can be performed in both the presence and the absence of a catalyst. As catalyst, both acidic compounds, such as, e.g., phosphoric acid and boric acid, as well as basic compounds, such as, e.g., potassium carbonate and sodium hydroxide, can be used.

U.S. Pat. No. 5,929,234 describes a process for the recovery of ε-caprolactam from polycaprolactam-containing waste material. The depolymerization is performed in the absence of added catalyst with superheated steam at a temperature of about 250° C. to about 400° C. and at a pressure within the range of about 1 atm to about 100 atm and substantially less than the saturated vapor pressure of water at the temperature wherein an ε-caprolactam-containing vapor stream is formed.

Reclaiming of ε-caprolactam usually requires essentially pure nylon 6 as source material. As such, processes for reclaiming of ε-caprolactam by recovering extraction liquid in nylon 6 polymerization plants, recycling nylon 6 scrap (i.e., nylon 6 polymer that is substantially free of non-nylon 6 materials) or products made of almost pure nylon 6 (e.g., fishing nets) have been known for a long time.

For example, DE4211609 discloses a process for the recovery of ε-caprolactam by thermal cleavage of polyamide 6 in the presence of small amounts of potassium carbonate at 250-320° C. and a process for the purification of the recovered ε-caprolactam. DE4211609 describes that the process is not only applicable to pure polyamide 6 products, but also to glass fiber containing and filler-containing polyamide 6 products, as well as to products containing impact modifiers. "Polyamide 6" as used by DE4211609 refers to pure polyamide 6 as well as polyamides, which are preferably based on polyamide 6 to more than 80% by weight.

CN103467378 discloses a process for producing ε-caprolactam by using recovered waste chinlon silks and leftovers, wherein phosphoric acid is used as a catalyst for depolymerization. Superheated steam is charged into the reaction system during the depolymerization process.

U.S. Pat. No. 5,869,654 discloses a process for the recovery of ε-caprolactam from polycaprolactam processing waste, wherein the polycaprolactam can be selected from scrap nylon 6 polymeric and/or oligomeric materials such as yarn waste, chip waste or extruder slag. The process comprises the step of: in the absence of added catalyst, contacting the polycaprolactam waste with superheated steam at a temperature of about 250° C. to about 400° C. and at a pressure within the range of about 1.5 atm to about 100 atm and substantially less than the saturated vapor pressure of water at the temperature wherein an ε-caprolactam-containing vapor stream is formed.

JP2000038471 discloses a process for depolymerizing a nylon 6 resin from moulded bodies to obtain ε-caprolactam, in particular the depolymerization of automotive resin parts such as nylon 6 fastener parts, electrical parts, body mechanism parts and exterior parts, in which nylon 6 accounts for 90% by weight or more of the total organic compounds in the moulded body.

Although processes for the depolymerization of almost pure waste nylon 6 to its valuable monomer, ε-caprolactam, have been developed, recovering ε-caprolactam from nylon 6-containing multi-component materials, especially such with moderate to high nylon 6 contents (e.g., 40 wt. % to 80 wt. %), is still a big challenge. Recovering ε-caprolactam from nylon 6-containing multi-component materials with low nylon 6 contents (e.g., less than 40 wt. %) is even more difficult. A nylon 6-containing product with moderate to high nylon 6 content is, e.g., carpet. High quality carpets typically comprise up to 55 wt. % nylon 6-containing face fiber. The remainder are backing (support) materials.

Reclaiming ε-caprolactam from nylon 6-containing materials with low and even moderate to high nylon 6 contents have not been commercially feasible or successful based on the existing methods.

Most commonly reported issues related to the recovery of ε-caprolactam from nylon 6-containing materials with moderate to high nylon 6 contents are low recovery yields. This low recovery yield is on the one hand due to difficulties in separating the formed ε-caprolactam from the non-nylon 6 materials. On the other hand, the low recovery yield is due to decomposition reactions which lead to the production of ammonia and due to the inhomogeneity of the depolymerization mixture since effective mixing is prevented due to the high viscosity of the depolymerization mixture so that local overheating and high consumption figures of expensive superheated steam (used as a stripping agent) occur.

The introduction of a mechanical pre-treatment step (e.g., shaving of the face fiber from the backing of the carpet or grinding followed by density separation, like sink-float separation and wind-sifting) allows to produce feedstocks of processed carpet material containing more than 90 wt. % of nylon 6, which can be used in the above-described prior art depolymerization processes. This mechanical pre-treatment is, however, mainly applied to off-spec material inside carpet and other nylon 6-based textile production facilities (pre-consumer wastes). It is also not transferrable to other, non-carpet nylon 6-containing multi-component materials.

Currently, no processes are available to recover high purity ε-caprolactam from nylon 6-containing multi-component materials in an economically reasonable manner despite the urgent need for such processes. In particular, there is an urgent need for ε-caprolactam recovery processes that will work with more demanding nylon 6-containing multi-component materials, e.g., such that have low to medium high nylon 6 contents (e.g., from 1 wt. % up to 35 wt. %) and for recovery of ε-caprolactam from complex nylon 6-containing multi-component products that cannot be pre-concentrated by a simple mechanical pre-treatment step (like shaving or grinding, followed by density separation). Finally, there is a need for processes that allow the recovery of ε-caprolactam from nylon 6-containing multi-component materials, like multi-layer films, in which nylon 6 layers are often sandwiched between non-nylon 6 components and therefore not accessible from the outer-surface of these materials).

Taken together, prior art processes for the recovery of ε-caprolactam from nylon 6-containing multi-component materials are not able to produce high quality ε-caprolactam grades that can be used to replace virgin ε-caprolactam grades for high demanding applications.

Currently, no processes are available to recover high purity ε-caprolactam from nylon 6-containing multi-component materials despite the urgent need for such processes. In particular, there is an urgent need for high purity ε-caprolactam recovery processes that can replace virgin ε-caprolactam grades for high demanding applications, like for high speed melt spinning during textile fiber production.

Further, there is a need for processes that allow the recovery of high purity ε-caprolactam from nylon 6-containing multi-component materials in an economically reasonable manner. The production costs of the recovered high purity ε-caprolactam should be in the same ballpark or lower than the production costs of virgin high purity ε-caprolactam.

And there is a need to purify the crude ε-caprolactam obtained by depolymerization of nylon 6-containing multi-component materials without using oxidation agents like potassium permanganate ($KMnO_4$) or adsorbents like (activated) carbon and kieselguhr. Technologies that are based on these oxidation agents and adsorbents are quite laborious and produce solid wastes.

Furthermore there is a need to provide high purity grade ε-caprolactam from nylon 6-containing multi-component materials that has a significantly lower carbon footprint than the ε-caprolactam produced by a process using virgin ε-caprolactam obtained via new synthesis, e.g., by Beckmann rearrangement of cyclohexanone oxime.

Finally, there is a need for processes that allow the recovery of ε-caprolactam from nylon 6-containing multi-component materials on an industrial scale in order to process the huge amounts of nylon 6-containing multi-component materials that are wasted annually.

SUMMARY OF THE INVENTION

It is an object of the present invention, to satisfy one or more of the above-described needs and to overcome or alleviate the disadvantages associated with the prior art processes.

In particular, it is an object of the present invention to provide a process for recovering high purity ε-caprolactam from nylon 6-containing multi-component waste materials in an economically responsible manner and with high recovery yields. It is in particular an object of the present invention to provide a process that is suitable to recover high purity grade ε-caprolactam from material derived from nylon 6-containing multi-component waste materials that does not exceed the production costs of virgin high purity ε-caprolactam. It is in particular an object of the present invention to provide a process that is suitable to recover ε-caprolactam from nylon 6-containing multi-component waste materials having nylon 6 contents up to 35 wt. % as well as from complex nylon 6-containing multi-component materials, in particular nylon 6-containing multi-layer films.

It is also an object of the present invention to provide a process for recovering high purity ε-caprolactam from material derived from nylon 6-containing multi-component waste materials that can replace high purity virgin ε-caprolactam for all applications including high speed melt spinning of nylon 6 for the production of thin textile fibers.

It is a further object of the invention to provide a process for recovering high purity grade ε-caprolactam from nylon 6-containing multi-component waste materials which is characterized by a significantly lower carbon foot print than a process for producing ε-caprolactam via new synthesis, e.g., by Beckmann rearrangement of cyclohexanone oxime.

The invention therefore also aims to provide a process that reduces the environmental burden of nylon 6-containing multi-component waste materials and products made therefrom.

It is a further object of the invention to provide a process for recovering high purity grade ε-caprolactam from material derived from nylon 6-containing multi-component waste materials on an industrial scale.

It is also an object of the invention to provide a process for purification of crude ε-caprolactam obtained by depolymerization of material derived from nylon 6-containing multi-component waste materials that does not produce solid wastes.

One or more further objects may become apparent from the remainder of the description.

All, several or at least one of the aforementioned objects are solved by the process of claim 1, the plant of claim 13 and the product of claim 15.

The present invention provides a process for recovering purified ε-caprolactam from material derived from nylon 6-containing multi-component material in a plant, wherein the plant comprises
  a depolymerization section [B],
  a recovery section [C], and
  a purification section [D],
    and wherein the process comprises the steps of:
  a) providing a pre-concentrated nylon 6-containing material that has been obtained by extracting a nylon 6-containing multi-component material with one or more solvents to obtain a solid pre-concentrated nylon 6-containing material, which is enriched in nylon 6 as compared to the nylon 6-containing multi-component material, and charging said pre-concentrated material derived from nylon 6-containing multi-component material to the depolymerization section [B];
  b) depolymerizing the material derived from nylon 6-containing multi-component material in the depolymerization section [B] at a temperature ranging from 180° C. to 400° C., preferably from 200° C. to 350° C., more preferably from 220° C. to 340° C., and most preferably from 240° C. to 325° C. so that an ε-caprolactam comprising stream is obtained;
  c) discharging the ε-caprolactam comprising stream from the depolymerization section [B] and recovering crude ε-caprolactam from said stream in the recovery section [C]; and
  d) purifying said crude ε-caprolactam in the purification section [D] to obtain purified ε-caprolactam wherein the purification comprises the steps of
    (i) extracting the crude ε-caprolactam with an organic solvent, whereby an organic phase is obtained, and wherein the organic phase comprises the organic solvent, ε-caprolactam and impurities; and
    (iv) obtaining purified ε-caprolactam by crystallization of ε-caprolactam from a solution comprising ε-caprolactam and impurities at a temperature of 10 to 95° C.

It was surprising that combining the special sequence of processing steps and process conditions according to the invention, i.e., the sequence of the above-defined pre-concentration, depolymerization, recovery and specific purification steps, allows to recover high grade ε-caprolactam from material derived from nylon 6-containing multi-component material in high yields and in a straight-forward and economically reasonable manner. The process of the invention is economically reasonable and advantageous from several points of view. Firstly, the process of the invention is suitable for a large variety of material derived from nylon 6-containing multi-component materials that can, e.g., differ in their overall composition and/or in their nylon 6 content. Secondly, the process of the invention allows to effectively separate ε-caprolactam from non-ε-caprolactam compounds so that high purity grade ε-caprolactam can be obtained that can replace high purity virgin ε-caprolactam for all applications including high speed melt spinning of nylon 6 for the production of thin textile fibers. Thirdly, the process of the invention is so effective that ε-caprolactam can be obtained in high yields. Fourthly, the process of the invention allows the recovery of ε-caprolactam from nylon 6 comprising multi-component material on an industrial scale in order to process the huge amounts of nylon 6 comprising multi-component material that are currently wasted. Lastly, the process of the invention allows to produce ε-caprolactam with a significantly lower carbon footprint compared to ε-caprolactam produced by de novo synthesis of ε-caprolactam, e.g., by the Beckmann rearrangement of cyclohexanone oxime. The process of the invention allows to process material derived from nylon 6-containing multi-component material efficiently and to reduce the environmental burden of said products. In particular, the process of the invention allows the production of purified ε-caprolactam with a carbon footprint of less than 2.5 kg $CO_2$ per kg purified ε-caprolactam, which is a substantial improvement compared to the 6.4 to 7.5 kg $CO_2$ per kg ε-caprolactam associated with the production of "virgin" ε-caprolactam obtained from a Beckmann rearrangement of cyclohexanone oxime.

Next to the process of the invention, the present invention also provides a plant for the production of purified ε-caprolactam from material derived from nylon 6-containing multi-component material in a plant, wherein the plant comprises
  a depolymerization section [B],
  a recovery section [C],
  a purification section [D].
The plant is configured for carrying out the process of the invention.

The present invention also provides purified ε-caprolactam obtained via depolymerization of nylon 6 that is produced from material derived from nylon 6-containing multi-component material according to a process of the invention, wherein the ε-caprolactam has a product carbon footprint of less than 2.5 kg $CO_2$ per kg purified ε-caprolactam.

Advantageous embodiments of the invention are indicated in the dependent claims and are explained in more detail in the following.

DETAILED DESCRIPTION OF THE INVENTION

The Nylon 6-Containing Multi-Component Material

The process of the invention uses nylon 6-containing multi-component material or multi-component material derived therefrom as starting material. The nylon 6-containing multi-component material typically is a solid, in particular a solid body, net, sheet or film material.

As used in the present disclosure and claims, the singular forms "a," "an," and "the" include plural forms, especially in the sense of "one or more", unless the context clearly dictates otherwise. Similarly, "material" used herein can in particular mean one or more materials.

Multi-component materials comprise two or more components. They are often used as a means of combining the properties of different components into a single material. The term "component" as used herein refers to a chemical substance. In a preferred embodiment, the nylon 6-containing multi-component material comprises nylon 6 and at least one non-nylon 6 polymer as components. The two or more components can be present as separate domains in the multi-component material (e.g., in a sheath and core configuration, an islands-in-the-sea configuration, a side-by-side configuration, multi-layer configuration or other configurations). Alternatively or additionally, the multi-component material can comprise a mixture of different components (e.g., in the form of polymer blends). Also mixtures of these two embodiments are possible, e.g., in the case of a multi-layer film comprising a layer of a single polymer and an additional layer of a polymer blend or polymer matrix filled with polymer filler particles. Typically, the nylon 6 is present in the nylon 6-containing multi-component material as a separate domain and/or as a mixture with the at least one non-nylon 6 polymer.

Preferably, the components of the multi-component material are at least two different polymers, one of which is or comprises nylon 6. In one embodiment at least two components of the multi-component material comprise or consist of polymers. In this embodiment, the multi-component material can comprise further non-polymer components. However, preferably, more than 80 wt. % of the multi-component material is made up of polymers. The term "polymer" used herein refers to the term's usual meaning, i.e., a large molecule (e.g., oligomer) or macromolecule composed of repeating subunits. Polymers, as used herein, can be of synthetic origin such as plastics including polypropylene, nylon 6 and polystyrene or of natural origin such as starch or proteins. The term "polymer" as used herein also includes homopolymers, copolymers and polymer blends. Polymers of natural and synthetic origin are created via polymerization of many small molecules, known as monomers. Homopolymers are prepared from only one type of monomer. Copolymers are prepared from different types of monomers, which can be in random or block configuration. "Polymer blend" or "blend" as used herein means a composition of two or more polymers and are usually obtained by extrusion. The blend may or may not be miscible, it may or may not be phase separated.

In one embodiment, at least one component of the multi-component material comprises or consists of nylon 6 and the at least one other component of the multi-component material comprises or consists of a polymer that is different from nylon 6. The polymer different from nylon 6 can be selected from the group consisting of polyolefins (especially polyethylenes and polypropylenes), polyethylene oxide, polypropylene oxide, polycaprolactone, polyamides (other than polyamide 6), polyesters, polyvinylidene fluoride, polyvinylidene chloride, polystyrene, polycarbonate, polymethylmethacrylate, ethylene-co-acrylic acid copolymers, polyoxymethylene, ethylene vinyl alcohol, polyurethanes and a combination, in particular blend, thereof. Particularly good results in terms of obtained ε-caprolactam purity and yield can be achieved when the polymer different from nylon 6 is selected from the group consisting of polyolefins (especially polyethylenes and polypropylenes), polyamides (other than polyamide 6, in particular polyamide 6,6, polyamide 4,6, polyamide 6,10, polyamide 12) and a combination thereof.

The multi-component material employed in the process of the invention comprises nylon 6. The term "nylon 6" used herein refers to polycaprolactam. The term "nylon 6-containing multi-component material" used herein refers to a multi-component material that comprises two or more components of which one is or comprises nylon 6. The weight fraction of nylon 6 in the nylon 6-containing multi-component material which is used in the process of the invention is not critical to practice the invention and can range from 0.5 wt. % to 99 wt. %. It is a special advantage of the process of the invention, however, that it works so well also for multi-component material containing only lower contents of nylon 6 as compared to the greater than 80 wt. % content of nylon 6 that are required for the processes of the prior art to successfully be applied in practice. Therefore, according to a particular advantageous embodiment, the weight fraction of nylon 6 in the nylon 6-containing multi-component material used in the process of the invention is from 1 wt. % to 75 wt. %, more preferably from 1 wt. % to 60 wt. %, even more preferably from 2 wt. % to 35 wt. % and most preferably from 3 wt. % to 25 wt. %. If not otherwise indicated, all wt. % values stated herein are always based on the total weight of the nylon 6-containing multi-component material.

The nylon 6-containing multi-component material might have any shape, including (multi-filament) yarn, chip, film or any moulded form. The shape of the nylon 6-containing multi-component material used for the process of the invention is not critical.

Preferably, the nylon 6-containing multi-component material used in the process of the invention is a multi-layer material, wherein at least one layer comprises or consists of nylon 6. The term "multi-layer material" used herein refers to material which is organized in different layers. The layers can differ in their relative position, thickness and/or composition. The layers can be of the same or of different type. Preferably, the multi-layer material contains at least one layer that does not comprise nylon 6. In a further preferred embodiment the multi-layer material comprises two skin layers as outermost layers on opposite sides of the multi-layer material, wherein both skin layers do not comprise nylon 6, which is thus contained in one of the layers sandwiched in between the skin layers. Nonlimiting examples of suitable polymers that can be used in the skin layers include polypropylenes, polyethylenes, polyethylene oxide, polycaprolactone, polyamides (other than nylon 6), polyesters, polyvinylidene fluoride, polyvinylidene chloride, polystyrene, polycarbonate, ethylene vinyl alcohol, polymethylmethacrylate, ethylene-co-acrylic acid copolymers, polyoxymethylene and blends of two or more of these. A particular advantage of the process of the invention is that it works with multi-layer material in which the nylon 6 does not need to be exposed or accessible at the surface of the material.

As non-nylon 6-containing skin or intermediate layer, the multi-layer material can contain a barrier layer. The barrier layer may be formed from any material with barrier properties. The barrier layer may comprise or consist of organic material, e.g., carbon; inorganic material, e.g., metal, ceramic, oxide; polymer material or a combination thereof. Nonlimiting examples of suitable polymers other than nylon 6 that can be employed in or as the barrier layer include: polyethylene terephthalate, ethylene vinyl alcohol, polyvinylidene chloride copolymers, polyamides (not being nylon 6), polyketones, blends of two or more of these; and blends with other polymers comprising one or more of these.

The multi-layer material may comprise tie or adhesive layers connecting the at least one nylon 6-containing layer with the other layer(s) in the multi-layer material. Nonlimiting examples of suitable polymers that can be employed as tie or adhesive layers include: olefin block copolymers such as propylene-based block copolymer sold under the tradename INTUNE™ (The Dow Chemical Company) and ethylene-based block copolymer sold under the tradename INFUSE™ (The Dow Chemical Company); polar ethylene copolymers such as copolymers with vinyl acetate, acrylic acid, methyl acrylate, and ethyl acrylate; ionomers; maleic anhydride-grafted ethylene polymers and copolymers; polyurethane adhesives; blends of two or more of these; and blends with other polymers comprising one or more of these.

In a preferred embodiment, "layer" as used herein refers to a "film". Even more preferably, the nylon 6-containing multi-component material used in the process of the invention is itself a film, i.e., a multi-layer film that contains at least one layer that comprises or consists of nylon 6. Preferably, the multi-layer film contains at least one layer comprising or consisting of nylon 6 and at least one layer not comprising nylon 6. The multi-layer film can be produced by any film lamination and/or coextrusion technique. The term "film" as used herein is defined as being a thin sheet with a thickness of less than 5 mm. "Layers" in films can be very thin, as in the cases of nanolayers. "Film" as used herein can be in the form of shapes, such as profiles, parisons, tubes, and the like, that are not necessarily "flat" in the sense of planar. In a preferred embodiment, the term "film" as used herein means a film consisting of or comprising more than 80 wt. % of polymer material. The use of multi-layer films in the process of the invention is advantageous since it is a common waste product. The majority of today's packaging films are multi-layer films. According to a practically particularly relevant embodiment, the "multi-layer film" as used herein is a packaging film, in particular a modified atmosphere packaging film, both of which are described in the background section above.

Due to the intimate connection between the film layers, it was very difficult prior to this invention to recover high-grade ε-caprolactam from nylon 6-containing multi-layer films, especially if the nylon 6-content was below 80 wt. % as indicated above and/or if the at least one nylon 6-containing layer is sandwiched in between two non-nylon 6-containing layers, which can but need not be skin layers, in the multi-layer film and therefore not very accessible. These types of multi-layer films, when used as nylon 6-containing multi-component material in step a), therefore present particularly advantageous embodiments of the invention. Thus, in particular, the nylon 6-containing multi-component material used in the process of the invention can be a multi-layer film that contains at least one layer comprising or consisting of nylon 6 that is sandwiched (i.e., embedded in between) in between two or more layers not comprising nylon 6. The multi-layer film may of course comprise further layers with or without nylon 6 at any position in between, on top or below these layers.

The process of the invention has the advantage that unlike processes of the prior art that were, e.g., restricted to nylon 6-containing fibers derived from carpets that needed to be subjected to a mechanical pre-processing step, the process of the invention is not so limited and in particular can also be applied very successfully to multi-layer films. In a particular embodiment, the nylon 6-containing multi-component material used in the process of the invention is not a carpet or a material derived from carpet. In another embodiment it is not a textile or material derived from a textile. In another embodiment it does not comprise nylon 6 fibers.

Possible Pre-Treatment Steps

The material derived from nylon 6-containing multi-component material that is used in step a) has been obtained by extracting a nylon 6-containing multi-component material with one or more solvents to obtain a solid pre-concentrated nylon 6-containing material, which is enriched in nylon 6 as compared to the nylon 6-containing multi-component material. This is described in more detail below. Before or after this pre-treatment, the material can be advantageously subjected to further pretreatment steps, which are described in the following.

Before being subjected to process step a) of the invention, the nylon 6-containing multi-component material or the pre-concentrated nylon 6-containing material preferably undergoes a pre-treatment, in particular a mechanical size reduction, washing and/or densification step. Thus, a mechanical size reduction, washing and/or densification section can precede (preferred) and/or follow the nylon 6-pre-concentration by extraction in the process of the invention. Preferably, the nylon 6-containing multi-component material is fragmented into pieces before it is extracted with one or more solvents in the nylon 6-pre-concentration before being subjected to process step a). This mechanical pre-treatment, i.e., the mechanical comminution or fragmentation of the nylon 6-containing multi-component material, can be achieved, e.g., by cutting, shredding, milling, grinding, or chipping. In a preferred embodiment, the nylon 6-containing multi-component material is charged to the nylon 6-pre-concentration in the form of pieces which have on average, along the longest axis of the piece, a length of 0.01 to 100 cm, preferably from 0.05 to 10 cm and most preferably from 0.1 to 5 cm. The skilled person can easily determine the average length along the longest axis of the employed pieces by first taking a representative sample of the pieces, then measuring the length of the longest axis of each of these pieces (e.g., 50 pieces), and finally calculating the average value of all these individual measurements. The preferred particle dimensions can also be described in terms of average particle weight. Preferably, the pieces of nylon 6-containing multi-component material have an average particle weight from 0.1 milligram to 100 kilogram, preferably from 1 milligram to 10 kilogram, more preferably from 10 milligram to 1 kilogram and most preferably from 10 milligram to 100 gram. Using pieces of nylon 6-containing multi-component material with the aforementioned dimensions has the advantage that the surface area is increased and/or the pieces can be more easily handled and/or mixed with the organic solvent which is added for the extraction in the nylon 6-pre-concentration.

Optionally, the nylon 6-containing multi-component material is cleaned prior to being nylon 6-pre-concentrated. This is advantageous because any (adhering) dirt that is removed will consequently not perturb the next steps of the process of the invention.

As used herein, the term "cleaning" is defined as any process of removing non-nylon 6 materials that are adhered to nylon 6-containing multi-component material or that are mixed with nylon 6-containing multi-component material. Cleaning is advantageous because any non-nylon 6 material that is removed will consequently not perturb the next steps of the process of the invention.

Optionally, the nylon 6-containing multi-component material is cleaned by washing with a solvent, preferably water. Preferably, washing agents ranging in concentrations from 0 to 30% by weight relative to the solvent are added to the solvent for an improved washing efficiency. In another preferred embodiment, the washing process includes a final rinsing step with (clean) washing solvent without washing agent in order to remove residues of washing agent and dirt present that are adhering to the nylon 6-containing multi-component material. Preferably, the washing solvent is heated to further enhance the washing process. Washing is advantageous because any (adhering) dirt that is removed will consequently not perturb the next steps of the process of the invention. Optionally, the nylon 6-containing multi-component material is dried after the cleaning step and prior to being nylon 6-pre-concentrated by extraction with an organic solvent. This has the advantage that the solvent which is added for the extraction therein is not diluted by or contaminated with the washing solvent. The washing is preferably carried out under friction. Different types of industrial washing systems are available on the market, like rotary plastic washers and (high speed) friction washers. Optionally, the mechanical size reduction and washing of the nylon 6-containing multi-component material are combined in e.g., so-called wet crushing machines Optionally, prior to the mechanical comminution or fragmentation of the nylon 6-containing multi-component material, metal fragments, rocks and other disturbing materials that cause severe wear of the equipment used for the mechanical comminution or fragmentation are removed. Preferably, non-nylon 6 comprising materials, like polyethylene, polypropylene and nylon 6,6 comprising materials are removed prior to the mechanical comminution or fragmentation of the nylon 6-containing multi-component material or afterwards as described further below. The removal of foreign materials can be done mechanically or manually. The removal of these disturbing materials has the advantage that the maintenance costs of the equipment used for the mechanical comminution or fragmentation can be reduced to a large extent. In addition, the nylon 6 content of the material obtained after mechanical comminution or fragmentation is higher than without removal of the disturbing materials.

Optionally, foreign materials are separated from the nylon 6-containing multi-component material that have been mechanically comminuted or fragmented. To this end, various separation processes can be applied, including, but not limited to, density separation and magnetic separation. In density separation, materials of different densities are placed in a liquid of intermediate density, where the less dense material floats and separates out from the more dense sinking material. In practice, density separation is often done by a series of density separation stages. E.g., in one stage, the high density materials like rocks, sand and metals (including iron and lead) are separated off, while in another stage low density materials, like polyolefins polypropylene and polyethylene, are separated off. Magnetic separation is the process of separating components of mixtures by using magnets to attract magnetic materials. The process that is typically used for magnetic separation detaches magnetic material from non-magnetic material. The removal of foreign materials in the comminuted or fragmented nylon 6-containing multi-component material is advantageous because such materials can disturb the subsequent steps of the process of the invention.

Optionally, nylon 6-containing multi-component material, that is preferably washed and reduced in size, is densified. Preferably, densification of nylon 6-containing multi-component material is done by charging to a smelter (e.g., an extruder) or by compacting in a (mechanical) compactor. Densification of nylon 6-containing multi-component material that is preferably cleaned and/or reduced in size has the advantage of an increased bulk density, which reduces the costs of intermediate storage and transportation in case the pretreatment is done at a different location (see below).

In the smelter the nylon 6-containing multi-component material is melted. Preferably, the resulting polymer melt is filtered. This has the advantage that solid impurities are removed. The melted and optionally filtered polymer melt is then cooled and preferably fed to a pelletizer. The pelletizer cuts the product into pellets. The dimensions and the shape of the pellets (also often called granules) can be chosen within wide limits. In general, pellets are cylindrical in shape (originating from thin strands that are chopped into pieces). Other shapes like (non-perfect) spheres, however, are also possible. The dimensions of the pellets can be chosen within wide limits. Usually, pellets have a diameter that ranges from 1 to 10 mm, preferably from 2 to 7 mm, more preferably from 3 to 5 mm. In a preferred embodiment, pellets have a length that ranges from 1 to 50 mm, preferably from 2 to 25 mm, more preferably from 3 to 15 mm.

Pelletization of nylon 6-containing multi-component material that is preferably cleaned and reduced in size has the advantage of an increased bulk density, which reduces the costs of intermediate storage and transportation in case the pretreatment is done at a different location (see below). Apart from density increase, pelletization also offers other benefits, such as a homogeneous shape and structure of the to-be-treated material which is advantageous for (automated) feeding into equipment applied for nylon 6-pre-concentration by extraction with a solvent.

The site where the pre-treatment of the nylon 6-containing multi-component material is performed and the site where the nylon 6-pre-concentration by extraction with a solvent is located can be the same. However, preferably, one or more of the pre-treatment steps are done at different locations, e.g., at a location that is specialized in pre-treatment of wasted polymer materials and especially nylon 6-containing multi-component material. Nylon 6-containing multi-component materials that have been pre-treated at various locations can then be shipped to the site where the nylon 6-pre-concentration by extraction with a solvent is located.

Therefore, according to a particular advantageous embodiment of the invention, prior to step a) matter comprising nylon 6-containing multi-component material is subjected to a pre-treatment and pre-concentration to obtain material derived from nylon 6-containing multi-component material in a pre-treatment section [A], in particular a cleaning in cleaning section [α] and/or mechanical size reduction in a mechanical size reduction section [β] and/or a densification section [γ] and an extraction section [ω].

Pre-Concentration of Nylon 6-Containing Multi-Component Material

In step a) of the process of the invention, material derived from nylon 6-containing multi-component material is provided, that has been obtained by extracting a nylon 6-containing multi-component material with one or more (in particular organic) solvents to obtain a solid pre-concentrated nylon 6-containing material, which is enriched in nylon 6 as compared to the nylon 6-containing multi-component material. This material is charged to the depolymerization section [B]. The prior pre-concentration of nylon 6-containing multi-component material is an important prerequisite for the starting material of the process of the invention, because it ensures high yields and the high quality of ε-caprolactam that can be obtained with the invention. The pre-concentration of nylon 6-containing multi-component material is particularly important when multi-layer films are used as starting material, in particular when the nylon 6-containing layer is sandwiched in between other polymer layers and therefore not directly accessible for depolymerization. The pre-concentration of nylon 6-containing multi-component material is also particularly important when multi-component material comprising nylon 6 and at least one non-nylon 6 polymer are used as starting material, in particular when the nylon 6 is present in the nylon 6-containing multi-component material as a separate domain and/or as a mixture with the at least one non-nylon 6 polymer and therefore not directly accessible for depolymerization.

The pre-concentration of nylon 6-containing multi-component material by extraction to obtain material derived from nylon 6-containing multi-component material that is charged to the depolymerization section [B] according to the invention typically comprises the following steps:

(i) adding the one or more solvents to the nylon 6-containing multi-component material, wherein in particular organic solvents are used;

(ii) performing a phase separation to obtain a liquid extract phase comprising solvent and dissolved components from the nylon 6-containing multi-component material and an at least partially solid phase comprising undissolved components of the nylon 6-containing multi-component material and optionally solvent;

(iii) removing the solvent from the liquid extract phase and, if present therein, also from the at least partially solid phase to obtain two solid phases, one of which is the pre-concentrated nylon 6-containing material that is enriched in nylon 6 as compared to the nylon 6-containing multi-component material that is used as starting material.

Step (i) also includes a treatment with the solvent, i.e., the solvent and the nylon 6-containing multi-component material are contacted for a sufficient time and under conditions sufficient to allow for dissolving of components from the nylon 6-containing multi-component material that are to be extracted. The phase separation in step (ii) can be performed by any suitable means known for solid/liquid phase separation. Suitable phase-separation means are, e.g., filters, centrifuges, cyclones, or settlers. The solvent removal in step (iii) is advantageously performed by evaporation of the solvent, whereby the dissolved components that were extracted from the nylon 6-containing multi-component material are obtained as remaining solid precipitate. However, various technologies exist and can be used which enable the recovery of a solvent from the dissolved compounds. These technologies are known to the skilled person and include cooling down, evaporation, distillation, precipitation by addition of a precipitation agent (solvents for depositing the dissolved polymers) and combinations thereof.

The term "extraction", "extracted", or "extracting", as used herein, means a physical or chemical method of removing one or more components from a substrate by means of a solvent followed by solvent removal and recovery of the extracted component(s). The one or more solvents can be used in the process of the invention to extract either nylon 6, in which case the pre-concentrated nylon 6-containing material is obtained as remaining solid residue after removal of the one or more solvents from the liquid solvent-containing extract phase, and/or to extract non-nylon 6-compounds from the nylon 6-containing multi-component material, in which case the remaining undissolved nylon 6-containing multi-component material, optionally after removal of any adhering solvent, is the pre-concentrated nylon 6-containing material referred to herein.

The term "pre-concentrated" used herein refers to the extraction of a nylon 6-containing multi-component material with one or more solvents with subsequent solvent removal to obtain a material that is enriched in nylon 6, as compared to the nylon 6-containing multi-component material that is used as starting material. "Enriched in nylon 6" means enriched as compared to the nylon 6-containing multi-component material that is used as starting material. The enrichment in nylon 6, is defined as the content of nylon 6 in wt. %, based on the total weight of polymers in the solid nylon 6-containing material obtained after extraction compared to the content of nylon 6 in wt. %, based on the total weight of polymers in the nylon 6-containing multi-component material that is used as starting material. This enrichment is very much dependent on the fraction of non-nylon 6 compounds that is removed. The degree of enrichment in the pre-concentrated nylon 6-containing material is advantageously of from 1.1 to 50, in particular of from 1.2 to 30, and more particularly of from 1.5 to 10. In case the starting material had a nylon 6 content of 20 wt. %, based on the total polymer content, and the pre-treated nylon 6-containing phase has a nylon 6 content of 80 wt. %, based on the total polymer content, then the degree of enrichment in nylon 6 is (80 wt. % divided by 20 wt. %=) 4.

The solvents used for the extraction in the nylon 6-pre-concentration section can be organic or inorganic solvents. Preferably, the solvent is an organic solvent. The extraction of the nylon 6-containing multi-component material with an organic solvent has the advantage that different components, in particular different polymers can be separated from each other, and in particular from the nylon 6 that is to be enriched, by their different solubilities in certain solvents.

The extraction usually involves (i) contacting the nylon 6-containing multi-component material with one or more solvents so that a liquid extract phase comprising solvent and dissolved compounds from the nylon 6-containing multi-component material and a usually solid or partially solid second phase consisting of the undissolved nylon 6-containing multi-component material is obtained, followed by (ii) a phase separation and (iii) solvent removal to obtain a pre-concentrated nylon 6-containing material.

As explained above, depending on whether (1) a nylon 6- or (2) a non-nylon 6-dissolving solvent is used, the pre-concentrated nylon 6-containing material is obtained (1) after solvent removal from the liquid extract phase comprising dissolved nylon 6 or (2) from the solid or partially solid second phase consisting of the undissolved, remaining nylon 6-containing multi-component material. Two or more different, in particular complementary, extractions can also be combined.

In the case of more than one solvent, the treatment can occur simultaneously or sequentially. If more than one solvent is used, the solvents should be distinguished in their ability to dissolve nylon 6. In a particular advantageous embodiment of the invention, step a) comprises an at least two-step procedure, in which (i) the nylon 6-containing multi-component material is first extracted with a solvent that is able to dissolve non-nylon 6-components, and subsequently, (ii), the undissolved, remaining nylon 6-containing multi-component material from that first extraction is treated and extracted with a solvent that is able to dissolve nylon 6, whereby after phase separation the pre-concentrated nylon 6-containing material is obtained, after removal of the solvent from the liquid extract phase comprising dissolved nylon 6 that is obtained from that second extraction. Proceeding in this way is particularly advantageous when multi-layer films are used as starting material, in particular when the nylon 6-containing layer is covered, in particular sandwiched in between other polymer layers, and therefore not directly accessible to nylon 6-dissolving solvents.

By the choice of the solvent(s) and the treatment conditions (e.g., temperature, treatment length and amount of solvent relative to the amount of nylon 6-containing multi-component material), the effect of the extraction can be influenced. Depending on the solvent(s) used, the extraction in step a) can be of the following type:

Pre-concentration steps, in which non-nylon 6 compounds are preferentially extracted from the nylon 6-containing multi-component material (then the obtained pre-concentrated nylon 6-containing material is the non-extracted nylon 6-containing multi-component material, optionally after removal of any adhering solvent);

Pre-concentration steps, in which nylon 6 compounds are preferentially extracted from the nylon 6-containing multi-component material (then the pre-concentrated nylon 6-containing material is obtained after removal of the solvent from the liquid extract phase comprising solvent and dissolved nylon 6); and Nylon 6 and non-nylon 6 compounds are preferentially extracted from the nylon 6-containing multi-component material in a sequential manner, i.e., a combination of extractions for non-nylon 6 compounds and nylon 6 is performed sequentially.

Extractions, in which non-nylon 6 compounds are preferentially extracted from the nylon 6-containing multi-component material can be performed with solvents that are suitable as selective extraction agents for non-nylon 6 compounds. These are solvents in which non-nylon 6 compounds are readily dissolved, while dissolution of nylon 6 in the solvent is limited. These solvents must have a high selectivity towards the dissolution of non-nylon 6 compounds. Apart from the choice of the solvent, also the temperature at which the extraction is performed, the treatment time and amount of solvent relative to the amount of nylon 6-containing multi-component material can have a major impact on the extraction selectivity. The choice of these parameters therefore depends on the type of non-nylon 6-containing components that shall be selectively removed. The skilled person can easily determine via simple test dissolution experiments, which solvents work for extracting the relevant non-nylon 6-containing components in a given nylon 6-containing multi-component material.

Any one or more of the organic solvents mentioned below in respect of particular non-nylon 6 compounds can be used as a solvent in the process of the invention.

For dissolving polyolefins (e.g., LD, LLD and HD polyethylene and polypropylene), e.g., solvents selected from the group consisting of aliphatic hydrocarbons, naphthenic hydrocarbons, aromatic hydrocarbons and mixtures thereof are particularly useful. They are obtained as boiling fractions in petroleum processing for the production of fuels like petrol and diesel. The aforementioned boiling fractions include paraffin wax, petroleum wax and white spirit, each of which can be used as solvent according to the invention. Isomeric mixtures of xylenes or pure solvents like toluene are also known to dissolve polyolefins. Chlorinated hydrocarbons like tetrachloroethane can also be used to dissolve polyolefins.

For dissolving polystyrenic polymers, a wide variety of solvents including aromatic organic solvents may be used. Preferably, benzene, toluene, xylene and mixtures thereof are used as solvents to dissolve polystyrenic polymers. Most preferably, xylene is used to dissolve polystyrenic polymers.

For dissolving polyvinyl chlorides, the solvents tetrahydrofuran, cyclohexane, dioxane and methylethylketone (MEK) and mixtures thereof are used preferably.

Solvents that can be used to dissolve other (polymeric) non-nylon 6 compounds are known to the skilled person or can easily be identified by performing test dissolution experiments. When choosing the solvent(s) for the extraction in the nylon 6-pre-concentration section, the flexibility of the process of the invention allows to take other factors into account including inter alia the stable commercial availability, the ease of handling, health aspects and the stability and cost of the solvent.

After an extraction in which non-nylon 6 compounds are preferably extracted with a solvent, the non-dissolved compounds are removed by phase separation from the mixture obtained in the nylon 6-pre-concentration section. The extraction should be performed in a way that the largest proportion by weight of the non-dissolved compounds upon extraction with a solvent that preferentially dissolves non-nylon 6 compounds should be nylon 6. The non-dissolved material, optionally, after removal of any adhering solvent, then represents the pre-concentrated nylon 6-containing material, which is enriched in nylon 6. The employed solvent is usually recovered from the extract phase and re-used in the nylon 6-pre-concentration section.

Optionally, the extraction, in which non-nylon 6 compounds are preferentially extracted, is performed more than once. By selecting another solvent and/or other process conditions (e.g., another extraction temperature), non-nylon 6 compounds that were not removed in a previous extraction can be removed in the additional extraction. After every extraction, a pre-treated, usually solid or partially solid, nylon 6-containing phase is obtained, which is more enriched in nylon 6 than the pre-concentrated nylon 6-containing material resulting from the previous extraction. In each extraction, more and more non-nylon 6 compounds are gradually extracted from the nylon 6-containing multi-component material.

Alternatively or as a complementary extraction to the extractions with non-Nylon 6-dissolving solvents described above, extractions, in which nylon 6 is preferentially extracted from the nylon 6-containing multi-component material, can be performed with solvents that are suitable as selective extraction agents for nylon 6. To preferentially extract nylon 6, solvents are used that dissolve nylon 6, while dissolution of non-nylon 6 is limited in these solvents. In other words, solvents with a high selectivity towards dissolution of nylon 6 should be used. Like for the selective dissolution of non-nylon 6 compounds, also the selective dissolution of nylon 6 compounds can be influenced by the choice of the solvent, the temperature at which the extraction is performed, the treatment time and amount of solvent relative to the amount of nylon 6-containing multi-component material.

Solvents known from prior art processes for extracting polyamides can be used in this nylon 6-specific extraction step. For example, EP603434 discloses suitable solvents for the dissolution of polyamides including nylon 6. The solvents include concentrated inorganic acids, formic acid, chloroacetic acid, phenols, cresols, alcoholic solutions of alkaline earth halides, aromatic alcohols such as phenyl ethanol and benzyl alcohol, as well as glycols, lactams and lactones. U.S. Pat. No. 5,840,773 discloses as solvents for dissolving polyamides such as nylon 6 aliphatic alcohols, e.g., methanol, ethanol, n-propanol, isopropanol, n-butanol, isobutanol, tert-butanol, pentanol, hexanol, 2-ethylbutanol, 4-methylpentanol, 1-heptanol, 2-heptanol, 4-heptanol, 2,4-dimethylpentanol, 1-octanol, 2-octanol, 2-ethylhexanol, 1-nonanol, 2-nonanol, n-decanol, n-undecanol, n-dodecanol, n-tridecanol, n-tetradecanol, n-pentadecanol, n-hexadecanol, n-octadecanol, and the like, and substituted monohydric and dihydric alcohols, such as 2-methoxy-1-ethanol and methylene glycol. In a preferred embodiment of U.S. Pat. No. 5,840,773, $C_1$-$C_{12}$ alcohols are employed. In particular, methanol and ethanol are preferably employed as extraction agent. The extraction agent might be a mixture of an aliphatic alcohol and water. U.S. Pat. No. 5,840,773 further discloses that an extraction time of 60 minutes has been found to be suitable for a methanol extraction of polyamide 6, with the extraction preferably being carried out in an autoclave at a temperature of about 135° C. to about 140° C. Along these lines, U.S. Pat. No. 5,840,773 mentions that polyamide 6,6 is preferentially dissolved in methanol at a temperature of at least about 140° C. In Example IV of U.S. Pat. No. 5,840,773 an extraction temperature for polyamide 6,6 of about 160° C. is applied.

Optionally, the extraction, in which nylon 6 is preferentially extracted, is performed more than once. After every extraction, a pre-concentrated nylon 6-containing material is obtained, which is more enriched in nylon 6 than the pre-concentrated nylon 6-containing material resulting from the previous extraction. This seems to be due to the fact that the amount of impurities in the pre-concentrated nylon 6-containing material which typically comprises non-nylon 6 compounds is gradually reduced by each extraction.

After an extraction in which nylon 6 compounds are preferentially extracted with a solvent, the solvent is recovered. In doing so, firstly, non-dissolved material is removed, e.g., by filtration or centrifugation, from the liquid extract phase that contains solvent and Nylon 6. The extraction should be performed in a way that the largest proportion by weight of the non-dissolved compounds are non-nylon 6 compounds. Secondly, solvent is recovered from the nylon 6-containing liquid extract phase to obtain the pre-concentrated solid nylon 6-containing material, which is enriched in nylon 6. Any of the above-described solvent removal technologies can be performed to separate dissolved nylon 6-containing material from the solvent, including cooling down, evaporation, distillation, precipitation by addition of a precipitation agent (solvents for depositing the dissolved polymers) and combinations thereof.

Extractions can also be combinations of sequential extractions with solvents that preferentially extract non-nylon 6 compounds and solvents that preferentially extract nylon 6. By such a combination of sequential extractions a nylon 6-containing phase is obtained that is even more enriched in nylon 6 than a nylon 6-containing phase pre-treated only once.

In an embodiment of the invention, the nylon 6-containing multi-component material is first extracted in a first nylon 6-pre-concentration section with a solvent that preferentially extracts non-nylon 6 compounds from the nylon 6-containing multi-component material to obtain a pre-concentrated nylon 6-containing material, which is enriched in nylon 6. In a second extraction, the pre-concentrated nylon 6-containing material, which is enriched in nylon 6 is treated with a solvent that preferentially extracts nylon 6 compounds from the pre-concentrated nylon 6-containing material, which is enriched in nylon 6 to obtain a pre-concentrated nylon 6-containing material, which is further enriched in nylon 6. This can then be used in step a). For example, in a first extraction, the non-nylon 6 compound LD polyethylene is removed from the nylon 6-containing multi-component material by extraction with white spirit. In a second extraction, the pre-concentrated nylon 6-containing material, which is enriched in nylon 6 is further extracted with methanol or aqueous methanol (e.g., weight ratio water to MeOH 1:19), whereby an even further pre-concentrated solid nylon 6-containing material is obtained after removal of the solvent (methanol, water).

According to another advantageous embodiment of the invention, the nylon 6-containing multi-component material is first treated in a first nylon 6-pre-concentration section with a solvent that preferentially extracts nylon 6 compounds from the nylon 6-containing multi-component material to obtain the pre-concentrated nylon 6-containing material, which is enriched in nylon 6. In a second extraction, the pre-concentrated nylon 6-containing material, which is enriched in nylon 6, is treated with a solvent that preferentially extracts non-nylon 6 compounds from the pre-concentrated nylon 6-containing material, which is enriched in nylon 6 to obtain a pre-concentrated nylon 6-containing material, which is further enriched in nylon 6. For example, in a first extraction nylon 6 is extracted from the nylon 6-containing multi-component material with ethanol to form, after recovery of the ethanol, the nylon 6-containing phase which is enriched in nylon 6. In a second extraction, the pre-concentrated nylon 6-containing material, which is enriched in nylon 6, is further extracted with toluene, whereby a nylon 6-containing phase is obtained which is further enriched in nylon 6.

The extraction with the solvent in the nylon 6-pre-concentration section is performed at temperatures between 0° C. and 350° C. (at higher temperatures, nylon 6 decomposes), more preferably between 20° C. and 210° C. and most preferably between 50° C. and 190° C. In this temperature range, the selective extraction of most solvents is enhanced.

The time needed for the extraction in the extraction section, i.e., the extraction with the solvent, can be easily determined by the skilled person via routine experimentation. The time allowed for extraction should preferably take into account the type of nylon 6-containing multi-component material and the amount of nylon 6 comprised therein and the accessibility thereof. The time needed for extraction can range from seconds to hours. Preferably, the time needed for extraction is more than 5 seconds and less than 6 hours. More preferably, the time needed for extraction is more than 15 seconds and less than 2 hours.

As a consequence of the extraction in the nylon 6-pre-concentration section, a solid pre-concentrated nylon 6-containing material is obtained that is enriched in nylon 6. The term "solid" in this respect refers to the state of the material at room temperature (20° C.). At higher temperatures, the pre-concentrated nylon 6-containing material can also be present as a melt. The pre-concentrated nylon 6-containing material is stable and can be stored for future use in step a) of the process of the invention or transported to a depolymerization section at a different location for this purpose. Thus, similarly as explained for the other pre-treatment steps above, the site where the nylon 6-pre-concentration by extraction with a solvent and the location(s) where steps a) to d) of the method of the invention are performed can be the same or different. Preferably, one or more of the pre-treatment and pre-concentration steps are done at different locations, e.g., at a location that is specialized in pre-treatment of wasted polymer materials and especially nylon 6-containing multi-component material. Nylon 6-containing multi-component materials that are pre-treated and have been pre-concentrated at various locations can then be shipped to the site where one or more of steps a) to d) of the method of the invention are performed.

The Charging Step a)

In step a) of the invention, the material derived from nylon 6-containing multi-component material, that has been obtained by extracting a nylon 6-containing multi-component material with one or more solvents to obtain a solid pre-concentrated nylon 6-containing material, which is enriched in nylon 6 as compared to the nylon 6-containing multi-component material is charged to the depolymerization section [B]. Optionally, prior to the extraction, the nylon 6-containing multi-component material from which the material derived from nylon 6-containing multi-component material has been obtained after extraction has been reduced in size and/or washed and/or melted and resolidified. The depolymerization section [B] comprises one or more depolymerization reactors that are operated in series and/or in parallel.

In one embodiment, the material derived from nylon 6-containing multi-component material is mechanically compressed into a smaller volume prior to being charged to the depolymerization section [B]. This has the advantage that less volume is needed for intermediate storage and transport and can also facilitate dosing to the depolymerization section [B].

In another embodiment, the material derived from nylon 6-containing multi-component material is compressed into particles with an increased density prior to being charged to the depolymerization section [B], e.g., by mechanical compaction or by extrusion of melted material followed by cooling and cutting it to size. Again, this has the advantage that less volume is needed for intermediate storage and transport and can facilitate dosing to the depolymerization section [B].

In a further preferred embodiment, the material derived from nylon 6-containing multi-component material is dried before being charged to the depolymerization section [B]. This has the advantage that less or no solvent is introduced to the depolymerization section [B]. Solvent introduced in the depolymerization section [B] is expected to negatively influence the depolymerization process (e.g., reduced depolymerization reaction rates, higher consumption of catalyst, higher energy consumption, formation of impurities due to reactions between solvent and ε-caprolactam and/or the vapor stream comprising ε-caprolactam and water that is obtained in the depolymerization section [B] is expected to contain more impurities).

The material derived from nylon 6-containing multi-component material is preferably fed to the depolymerization reactor(s) as a solid phase or as a melt. Preferably, the material derived from nylon 6-containing multi-component material is charged as a melt. Feeding as a melt can be achieved by using an extruder, gear pump, or other means known by the skilled person.

The feeding of the material derived from nylon 6-containing multi-component material to the depolymerization reactor(s) may be realized by continuous or by intermittent dosing of the material derived from nylon 6-containing multi-component material.

The Depolymerization Step b)

In the depolymerization section [B], the material derived from nylon 6-containing multi-component material is depolymerized to form ε-caprolactam. The formed ε-caprolactam is discharged from the depolymerization section [B] as an ε-caprolactam comprising stream.

The depolymerization of the material derived from nylon 6-containing multi-component material is achieved by increasing the temperature of the material derived from nylon 6-containing multi-component material to a temperature of at least 180° C., but not higher than 400° C. in the depolymerization section [B]. The preferred temperature range for the depolymerization reaction is from 200° C. to 350° C., more preferably from 220° C. to 340° C., and most preferably from 240° C. to 325° C.

Generally, the rate of ε-caprolactam formation increases at elevated temperatures. Temperatures lower than 400° C. are preferred since at temperatures above 400° C. side reactions of nylon 6 and reactions of impurities occur more frequently, which will result in formation of a more diverse set of impurities. Part of these impurities will end-up in the ε-caprolactam comprising product stream that is discharged from the depolymerization reactor(s). In a preferred embodiment of the invention, the depolymerization of the material derived from nylon 6-containing multi-component material is conducted at temperatures ranging of from 220° C. to 340° C. or 240° C. to 325° C. This temperature range allows production of particularly pure ε-caprolactam.

The pressure in the depolymerization section [B] can vary and might range from 1 kPa to 100 MPa, preferably from 10 kPa to 5 MPa, more preferably from 25 kPa to 2 MPa, most preferably from 50 kPa to 1 MPa. This pressure range allows production of particularly pure ε-caprolactam.

The depolymerization of material derived from nylon 6-containing multi-component material can be achieved in the presence or in the absence of a solvent. Preferably, the depolymerization of the material derived from nylon 6-containing multi-component material is achieved in the presence of water as solvent. In this case, the water is preferably in the form of steam, in particular superheated steam.

Preferably, depolymerization will be complete in 0.1 hour to 24 hours, more preferably in 0.5 hour to 6 hours.

Feeding the water as steam to the depolymerization reactor allows, optionally without further heating, to obtain a vapor stream comprising ε-caprolactam and water. The weight to weight ratio of ε-caprolactam to water in this vapor stream can be adjusted by modifying the amount of steam that is fed to the material derived from nylon 6-containing multi-component material in the depolymerization section [B]. In a preferred embodiment, the depolymerization in step b) is performed in the presence of water, whereby the ε-caprolactam comprising stream is a vapor stream comprising ε-caprolactam and water in a weight to weight ratio of from 1:1 to 1:50, preferably from 1:2 to 1:15, more preferably from 1:2 to 1:10 and most preferably from 1:3 to 1:8.

Preferably, the ε-caprolactam in the vapor stream comprising ε-caprolactam and water has a partial pressure of 0.1 kPa to 1 MPa, more preferably of 0.3 kPa to 0.5 MPa, and most preferably of 1 kPa to 0.1 MPa.

During the depolymerization reaction, decomposition products may be formed including linear oligomers of ε-caprolactam and cyclic oligomers of ε-caprolactam. In addition, the feed stream of the material derived from nylon 6-containing multi-component material may also contain other components, i.e., impurities such as non-nylon 6 compounds and residues of solvents(s) applied in the pre-treatment that remain stable, react or decompose under the depolymerization conditions. Thus, in case water is used as solvent then the vapor stream which is removed from the depolymerization section [B] does not only comprise water and ε-caprolactam, but also impurities.

Preferably, superheated steam with a temperature between 100° C. and 600° C. is charged to the depolymerization reactor(s). Preferably, the superheated steam that is charged to the depolymerization reactor(s) has a temperature of at least the melting temperature of nylon 6. Preferably, the energy content of the superheated steam that is charged to the depolymerization reactor(s) is sufficiently high so that no other heat input is needed for performing the depolymerization reaction and evaporating the formed ε-caprolactam. In another preferred embodiment, the depolymerization section [B] is charged with superheated steam having a temperature ranging of from 220° C. to 575° C. In an even more preferred embodiment, the depolymerization section [B] is charged with super-heated steam having a temperature ranging of from 275° C. to 500° C. In another preferred embodiment, a part of the heat input that is needed for performing the depolymerization reaction and evaporating the formed ε-caprolactam is introduced via the walls of the depolymerization reactor(s).

Generally, the mass of the vapor stream, which is removed from the depolymerization section [B], is less than the mass of the total feed to the depolymerization section. The total feed to the depolymerization section [B] comprises material derived from nylon 6-containing multi-component material and optionally solvent, catalyst, additional agents and/or depolymerizing agents. Thus, without any additional measures, there will be an accumulation of material (often called 'residual material') in the depolymerization section [B]. Preferably, another stream is discharged from the depolymerization section [B]. This has the advantage that the accumulation of material in the depolymerization section [B] is reduced or avoided. The additional stream can comprise impurities present in the nylon 6-containing multi-component material, non-depolymerized nylon 6, non-evaporated ε-caprolactam, catalyst(s) and compounds that were formed under the depolymerization conditions, like mono-, di- and/or triammonium phosphate, in case phosphoric acid is used as depolymerization catalyst. In a preferred embodiment, a stream comprising mono-, di- and/or triammonium phosphate is discharged from the depolymerization section [B]. Even more preferably, this stream, which is intermittently or continuously discharged from the depolymerization section [B], comprises mono-, di- and/or triammonium phosphate in a weight fraction of 0.01 to 50% by weight, preferably from 0.1 to 25% by weight, more preferably from 0.5 to 10% by weight, most preferably from 0.5 to 5% by weight.

The depolymerization of the material derived from nylon 6-containing multi-component material in the presence of steam can be performed with the presence of additional depolymerizing agents, such as ammonia. The concentration of ammonia in the depolymerization section [B] can vary. Thus, in case ammonia is present in the depolymerization section [B], then the vapor stream which is removed from the depolymerization section [B] does not only comprise ε-caprolactam and impurities, but may also comprise ammonia.

Most preferably, the depolymerization is carried out in the presence of a catalyst. Preferably, the used catalyst is a (Lewis or Brønsted) acid or base. The acid catalyst can in particular be selected from the group consisting of orthophosphoric acid, p-toluenesulfonic acid, boric acid, sulfuric acid, organic acid, organic sulfonic acid including xylenesulfonic acid, 4-sulfoisophthalic acid and other sulfonated aromatic hydrocarbons, solid acid, salts of the aforementioned acids, $Al_2O_3$ and $SiO_2$, and combinations thereof. The base catalyst can, e.g., be selected from the group consisting of alkali hydroxide, alkali salt, alkaline earth hydroxide, alkaline earth salts, organic bases and solid bases, and combinations thereof. Preferably, orthophosphoric acid, boric acid, organic acid, alkali hydroxides and alkali salts are used as catalysts. More preferably, orthophosphoric acid, sodium phosphate, potassium phosphate, sodium hydroxide, potassium hydroxide, sodium carbonate, potassium carbonate, sodium hydrogen carbonate and potassium hydrogen carbonate are used as catalysts. Still more preferably, orthophosphoric acid, p-toluenesulfonic acid, boric acid and sodium hydroxide are used as catalysts. In one particularly preferred embodiment, orthophosphoric acid is used as catalyst for the depolymerization, in another, p-toluenesulfonic acid is used.

In another preferred embodiment, however, no catalyst is used for the depolymerization of the material derived from nylon 6-containing multi-component material. This has the advantage of lower costs (both for the catalyst and the disposal of catalyst waste). However, higher temperatures (and pressures) are usually required compared to depolymerizations of the material derived from nylon 6-containing multi-component material that are carried out in the presence of a catalyst.

The advantage of using a catalyst (and especially of orthophosphoric acid) is that the depolymerization reaction already starts at lower temperatures and can be performed under atmospheric conditions. A suitable concentration of catalyst used for the depolymerization of nylon 6 to ε-caprolactam is known to the skilled person and can easily be determined by routine experimentation. If the concentration of the used catalyst is too low, the reaction rate is slow. On the contrary, if the concentration of the used catalyst is too high, the reaction is fast, but also side reaction(s) increase. Moreover, the catalyst costs are increased, which is economically disadvantageous. Preferably, the catalyst content is from 0.01 to 100% by weight relative to the nylon 6 contained in the depolymerization reactor. Even more preferably, the catalyst content is from 0.1 to 50% by weight. The optimum catalyst concentration depends on the type of catalyst that is applied for the depolymerization of nylon 6. For the catalyst orthophosphoric acid, the preferred content is from 0.1 to 25% and more preferred from 1 to 20% by weight. The preferred content for the catalyst p-toluenesulfonic acid is from 10 to 35% by weight and the more preferred content from 15 to 30% by weight.

The depolymerization of nylon 6 can be performed in a batch mode, in a semi-continuous mode or in a continuous mode, all of which are known to the skilled person. The terms "batch mode", "semi-continuous mode" and "continuous mode", as used herein, refer to the mode in which the nylon 6-containing feedstock, i.e., the material derived from nylon 6-containing multi-component material, and optionally catalyst are charged to the depolymerization reactor and to the mode in which the residual material is discharged from the depolymerization reactor.

In a preferred embodiment, the nylon 6 depolymerization is performed in the batch mode. In the batch mode, the feedstock, i.e., the material derived from nylon 6-containing multi-component material, and optionally catalyst are initially charged to the depolymerization reactor. Subsequently, superheated steam is charged to the depolymerization reactor and ε-caprolactam is discharged from the depolymerization reactor as vapor stream comprising ε-caprolactam and water. Next, charging of the superheated steam to the depolymerization reactor is interrupted. After optionally removing residual material from the depolymerization reactor, a new cycle is started by charging feedstock (and optionally catalyst) to the depolymerization reactor. In a preferred embodiment, residual material is not removed in between every cycle.

In a particular advantageous embodiment, the nylon 6 depolymerization is performed in the continuous mode. In the continuous mode, the nylon 6-containing feedstock (and optionally catalyst) is continuously charged to the depolymerization reactor. At the same time, superheated steam is continuously charged to the depolymerization reactor and ε-caprolactam is continuously discharged from the depolymerization reactor as vapor stream comprising ε-caprolactam and water. Optionally, the catalyst is continuously or intermittently charged to the depolymerization reactor. In addition, residual material is continuously discharged from the depolymerization reactor. Preferably, the material derived from nylon 6-containing multi-component material is charged as a melt. Preferably, the catalyst is charged as a melt, a slurry or a solution.

In another preferred embodiment, the nylon 6 depolymerization is performed in the semi-continuous mode. In the semi-continuous mode, nylon 6-containing feedstock (and optionally catalyst) is intermittently charged to the depolymerization reactor, while superheated steam is continuously charged to the depolymerization reactor and ε-caprolactam is continuously discharged from the depolymerization reactor as a vapor stream comprising ε-caprolactam and water. Residual material is intermittently discharged from the depolymerization reactor in the semi-continuous mode of nylon 6 depolymerization.

The Recovery Step c)

In the recovery section [C], ε-caprolactam is recovered from the ε-caprolactam comprising stream that is discharged from the depolymerization section [B]. This stream comprises ε-caprolactam and impurities. Preferably, this recovery is performed by a (partial) condensation of the ε-caprolactam comprising stream.

Preferably, in case no solvent is charged to the depolymerization section [B], the ε-caprolactam that is obtained by condensation is dissolved in water, whereby an ε-caprolactam-rich phase is obtained. This ε-caprolactam-rich phase also comprises impurities.

Preferably, in case water is charged to the depolymerization section [B] as solvent, the ε-caprolactam comprising stream that is discharged from the depolymerization section [B] comprises ε-caprolactam, water and impurities. Water can be charged as a liquid or in the form of steam. Preferably, water is charged in the form of steam. The ε-caprolactam can be separated from the ε-caprolactam comprising stream that is discharged from the depolymerization section [B] by sending this vapor or gaseous stream from the depolymerization reactor, preferably overhead, to a (preferably partial) condenser to obtain a condensate containing ε-caprolactam. Preferably, the ε-caprolactam is separated from the remaining components of the vapor stream by sending the product stream from the depolymerization reactor, preferably overhead, to a distillation column from which a water-rich phase is obtained as top product and an ε-caprolactam-rich phase as bottom product.

The ε-caprolactam recovered in the recovery section [C] is crude since it contains impurities such as nylon 6 decomposition products or other impurities stemming from (decomposition products/reactions of) non-nylon 6 components of the material derived from nylon 6-containing multi-component material. The crude ε-caprolactam that is recovered in step c) comprises water and ε-caprolactam, preferably it is an aqueous solution comprising ε-caprolactam. Thus, the crude ε-caprolactam recovered in the recovery section [C] requires additional purification to yield high purity ε-caprolactam. "Crude" as used herein can therefore be defined as being less pure, i.e., containing more impurities, than the purified ε-caprolactam obtained as the product of the process of the invention.

Preferably, the crude ε-caprolactam comprises ε-caprolactam in the range of from 6 to 95% by weight, more preferably from 20 to 90% by weight, and most preferably from 35 to 80% by weight. The remainder is mainly water.

The Purification Step d)

In step d) the crude ε-caprolactam which is obtained in the recovery section [C] is purified in the purification section [D] to yield high purity ε-caprolactam.

Optionally, the crude ε-caprolactam is filtered before being charged to the purification section [D]. The filtration ensures the removal of undissolved impurities which could otherwise hinder the further purification process.

Optionally, oil is separated from the crude ε-caprolactam before being charged to the purification section [D]. The oil separation ensures the removal of impurities which could otherwise hinder the further purification process.

Purified ε-caprolactam is obtained from the crude ε-caprolactam by first extracting in step (i) the crude ε-caprolactam with an organic solvent, whereby an aqueous phase and an organic phase comprising the organic solvent, ε-caprolactam and impurities are obtained. The organic solvent with which the crude ε-caprolactam is extracted is preferably an aromatic hydrocarbon, an aliphatic hydrocarbon, a cycloaliphatic hydrocarbon, a halogenated hydrocarbon and/or a $C_4$-$C_{10}$ aliphatic or cycloaliphatic alcohol. Optionally, the organic solvent with which the crude ε-caprolactam is extracted is preferably a mixed extractant which consists of an aromatic hydrocarbon, an aliphatic hydrocarbon, a cycloaliphatic hydrocarbon, a halogenated hydrocarbon and/or a $C_4$-$C_{10}$ aliphatic or cycloaliphatic alcohol, and a $C_5$-$C_8$ alkane or $C_5$-$C_8$ cycloalkane. Particularly good purification results are achieved if the organic solvent for extraction of the crude ε-caprolactam is selected from the group consisting of cyclohexane, benzene, toluene, methylene chloride, chloroform, trichloroethane, 4-methyl-2-pentanol (a.k.a. MIBC, methyl isobutyl carbinol), 1-octanol, 2-ethylhexanol and mixtures thereof. More preferably, the organic solvent for extraction of the crude ε-caprolactam is selected from the group consisting of benzene, toluene, alcohols, and mixtures thereof. Still more preferably, the organic solvent for extraction of the crude ε-caprolactam is selected from the group consisting of toluene, 1-octanol, 4-methyl-2-pentanol, 2-ethylhexanol, and mixtures thereof. Preferably, the weight ratio of organic solvent to ε-caprolactam is from 0.01:1 to 40:1, preferably from 0.05:1 to 15:1 and more preferably from 0.1:1 to 7:1.

Optionally, the organic solvent for extraction of the crude ε-caprolactam is mixed with an alkane, $C_mH_{2m+2}$ wherein m is 5 to 8, a cycloalkane or $C_mH_{2m}$ wherein m is 5 to 8 so that a mixed extraction agent is formed. Particularly good results are achieved if the alkane or cycloalkane is present in the mixed extraction agent in the range of from 5 to 90% and preferably from 25 to 75% by weight of the total weight of the mixed extraction agent.

In a preferred embodiment, in which the organic solvent has a lower density than the crude ε-caprolactam, the extraction with organic solvent in step d)(i) is carried out in a counter-current operated extraction column, whereby the crude ε-caprolactam to be purified is introduced at the upper part and the organic solvent at the lower part of the column. The extraction results in an aqueous phase comprising water and impurities, and an organic phase comprising the organic solvent, ε-caprolactam and impurities, with a weight ratio of impurities to ε-caprolactam that is reduced compared to the weight ratio of impurities to ε-caprolactam in the crude ε-caprolactam. So, as a consequence of this extraction, the ε-caprolactam is purer than before the extraction.

In another preferred embodiment of the invention, in which the organic solvent has a higher density than the crude ε-caprolactam, the extraction with organic solvent in step d)(i) is carried out in a counter-current operated extraction column, whereby the crude ε-caprolactam to be purified is introduced at the lower part and the organic solvent at the upper part of the column. The extraction results in an aqueous phase comprising water and impurities, and an organic phase comprising the organic solvent, ε-caprolactam and impurities, with a weight ratio of impurities to ε-caprolactam that is reduced compared to the weight ratio of impurities to ε-caprolactam in the crude ε-caprolactam. So, as a consequence of this extraction, the ε-caprolactam is purer than before the extraction.

Optionally, the organic phase comprising the organic solvent, ε-caprolactam and impurities is washed with water or with an aqueous alkaline solution before entering step d)(iv). If washing is performed with an aqueous alkaline solution, the alkaline solution is preferably an aqueous solution comprising an alkali metal hydroxide and/or alkali metal carbonate, preferably sodium hydroxide or potassium hydroxide. Said alkali metal hydroxide solution preferably comprises 0.5 to 2.0% by weight of sodium hydroxide or potassium hydroxide.

The skilled person can determine by routine experimentation the amount of water or aqueous alkaline solution necessary for efficient washing of the organic phase comprising the organic solvent, ε-caprolactam and impurities. Preferably, this amount is between 0.1 and 5% by weight relative to the amount of organic solvent excluding ε-caprolactam dissolved in the to-be-washed organic phase. In another preferred embodiment, the washing of the organic phase comprising the organic solvent, ε-caprolactam and impurities with water or aqueous alkaline solution is carried out in a counter current operated washing column, whereby the organic phase comprising the organic solvent, ε-caprolactam and impurities is introduced at the bottom and the water or aqueous alkaline solution at the top of the column. The washing results in a washed organic phase comprising the organic solvent, ε-caprolactam and impurities and an aqueous residue-comprising phase. Usually, the aqueous residue-comprising phase comprises water, ε-caprolactam and impurities. As a consequence of the washing, the impurity content of the washed organic phase is reduced compared to the impurity content of the organic phase before washing.

Optionally, according to step d)(ii) of the process of the invention, the obtained organic phase comprising the organic solvent, ε-caprolactam and impurities, that is optionally washed with water or with an aqueous alkaline solution, is solvent switched, whereby the organic solvent in the organic phase comprising the organic solvent, ε-caprolactam and impurities is replaced by water and whereby an aqueous phase comprising water, ε-caprolactam and impurities with lower- or higher-boiling points than ε-caprolactam is obtained and wherein the solvent switch process is selected from processes based on back-extraction (a.k.a. reextraction) with water, and processes based on solvent swap distillation, whereby the organic solvent is distilled off and water is charged.

The term "replaced" as used herein means that at least 60%, preferably at least 80% and most preferably at least 90, 95 or 98% by weight of the organic solvent present in the organic phase comprising the organic solvent, ε-caprolactam and impurities is replaced by water.

The solvent switch can be a process based on back-extraction with water, whereby an aqueous phase comprising water, ε-caprolactam and impurities with lower- or higher-boiling points than ε-caprolactam is obtained. Preferably, this aqueous phase comprising water, ε-caprolactam and impurities with lower- or higher-boiling points than ε-caprolactam is stripped and/or distilled to remove residual organic solvent. Although the amount of the water used for the back-extraction of ε-caprolactam can vary, the amount of the water used is preferably 0.3 to 20 times, more preferably 0.4 to 10 times and most preferably 0.5 to 5 times by weight based on the recovered ε-caprolactam.

Preferably, the back-extraction with water is carried out in a counter-current operated extraction column.

In another preferred embodiment, in which the organic phase comprising the organic solvent, ε-caprolactam and impurities, that has been optionally washed, has a lower density than water, the organic phase is introduced at the lower part of the extraction column and the water at the upper part of the extraction column. The back-extraction results in an organic solvent phase that comprises impurities, and in an aqueous phase comprising water, ε-caprolactam and impurities with lower- or higher-boiling points than ε-caprolactam, with a weight ratio of impurities to ε-caprolactam that is reduced compared to the weight ratio of impurities to ε-caprolactam in the organic phase comprising the organic solvent, ε-caprolactam and impurities prior to the back-extraction. Thus, because of the back-extraction, purer ε-caprolactam is obtained. Preferably, the organic solvent phase that comprises impurities is, optionally after purification (preferably by distillation), re-used.

In another preferred embodiment, in which the organic phase comprising the organic solvent, ε-caprolactam and impurities has a higher density than water, the organic phase is introduced at the upper part of the extraction column and the water at the lower part of the extraction column. The back-extraction results in an organic solvent phase that comprises impurities, and in an aqueous phase comprising water, ε-caprolactam and impurities with lower- or higher-boiling points than ε-caprolactam, with a weight ratio of impurities to ε-caprolactam that is reduced compared to the weight ratio of impurities to ε-caprolactam in the organic phase comprising the organic solvent, ε-caprolactam and impurities prior to the back-extraction. Thus, because of the back-extraction, the ε-caprolactam is purer than before the back-extraction. Preferably, the organic solvent phase that comprises impurities is, optionally after purification (preferably by distillation), re-used.

Therefore, according to a particular advantageous embodiment of the invention, after the extraction of the crude ε-caprolactam in step d)(i), the purification in step d) also comprises the step of (ii)a) solvent switching based on back-extraction with water.

The solvent switch process can also be a process based on solvent swap distillation, whereby the organic solvent is distilled off and water is charged. In a preferred embodiment, the solvent switch process is a process based on solvent swap distillation that is performed as a single-stage process, whereby the organic solvent is distilled off from the organic phase comprising the organic solvent, ε-caprolactam and impurities, and water is charged. More preferably, the solvent switch is performed as an azeotropic distillation with water addition in which case the organic solvent is evaporated as an azeotropic mixture comprising organic solvent and water. The purpose of the azeotropic distillation is to remove organic solvent and to add water. Preferably, substantially all of the organic solvent is removed. "Substantially all" in this context means that at least 90%, preferably at least 95% and most preferably at least 98 or 99% by weight of the organic solvent present in the organic phase comprising the organic solvent, ε-caprolactam and impurities is removed. Preferably, the water is added as a liquid. More preferably, water, in the liquid state, is added to the upper part of the distillation column as reflux. Even more preferably, a part of the water that is added as reflux is obtained by condensation of the azeotropic mixture that is distilled off in the distillation column.

Any suitable vessel may be used for the solvent switch process, for example a column, preferably a distillation column that is operated in a continuous mode. The distillation column may include trays, packing or a combination thereof.

In another preferred embodiment, the solvent swap distillation is performed as a two-stage process. The first stage is a pre-concentration stage and the second stage is the actual solvent swap distillation.

The organic phase comprising the organic solvent, ε-caprolactam and impurities is charged to the first stage. In the first stage, a first fraction of the organic solvent is removed by distillation from the organic phase comprising the organic solvent, ε-caprolactam and impurities at the upper part of the distillation column. Preferably, this distillation is performed under reflux. Under reflux means that organic solvent, in the liquid phase, is charged to the upper part of the distillation column. More preferably a part of the organic solvent that is removed by distillation at the upper part of a distillation column is, after condensation, charged as a liquid to the upper part of the distillation column. The remaining organic phase comprising the organic solvent, ε-caprolactam and impurities is discharged from the first stage and charged to the second stage. Due to distillation in the first stage, the chemical composition of the remaining organic phase comprising the organic solvent, ε-caprolactam and impurities is different from the organic phase comprising the organic solvent, ε-caprolactam and impurities that is charged to the first stage. Generally, compared to the organic phase comprising the organic solvent, ε-caprolactam and impurities that is charged to the first stage, the remaining organic phase comprising the organic solvent, ε-caprolactam and impurities contains a higher amount in percent weight of ε-caprolactam and compounds with a higher boiling point than ε-caprolactam and a lower percent in weight of compounds with a boiling point lower than ε-caprolactam.

In the second stage, the remaining organic solvent is distilled off from the remaining organic phase comprising the organic solvent, ε-caprolactam and impurities, and water is charged. More preferably, in the second stage, the solvent switch is performed as an azeotropic distillation with water addition in which case the organic solvent is evaporated as an azeotropic mixture comprising organic solvent and water.

Any suitable vessel may be used in each stage for the solvent switch, for example a column, preferably a distillation column that is operated in a continuous mode. The distillation column may include trays, packing or a combination thereof.

The solvent swap distillation (either performed as a single-stage process or as a two-stage process) results in an aqueous phase comprising water, ε-caprolactam and impurities with lower- or higher-boiling points than ε-caprolactam and optionally residual organic solvent. Preferably, the ε-caprolactam content of this aqueous phase is between 25 and 99.9%, more preferably between 50 and 99.5% and most preferably between 85 and 99% by weight relative to the entire aqueous phase.

Therefore, according to a particular advantageous embodiment of the invention, after the extraction of the crude ε-caprolactam in step d)(i), the purification in step d) also comprises the step of (ii)b) solvent switching based on solvent swap distillation.

Optionally, according to step d)(iii) of the process of the invention, impurities with lower- or higher-boiling points than ε-caprolactam are removed by distillation under vacuum conditions prior to the crystallization in step d)(iv), whereby a phase comprising ε-caprolactam and impurities is obtained. The obtained phase comprising ε-caprolactam and impurities is purer, i.e., contains less impurities, than the phase that is charged to step d)(iii).

In step d)(iii) of the process of the invention, the organic phase comprising the organic solvent, ε-caprolactam and impurities, that is optionally washed with water or with an aqueous alkaline solution, that is obtained by extraction in step d)(i) is distilled to remove organic solvent and impurities with lower- or higher-boiling points than ε-caprolactam from said organic phase. Preferably, the distilling is carried out at reduced pressure. Even more preferably, the distillation is effected at a pressure of less than 80 kPa, more preferably less than 20 kPa and most preferably less than 10 kPa. Preferably, the temperature is between 90° C. and 210° C., and more preferably between 110° C. and 180° C. These temperatures refer to the temperature in the bottom of the distillation column in which the distillation is performed.

Alternatively, in step d)(iii) of the process of the invention, the aqueous phase comprising water, ε-caprolactam and impurities with lower- or higher-boiling points than ε-caprolactam that is obtained by solvent switching in step d)(ii) is distilled to remove impurities with lower- or higher-boiling points than ε-caprolactam from said aqueous phase.

Preferably, water is evaporated first from the aqueous phase comprising water, ε-caprolactam and impurities with lower- or higher-boiling points than ε-caprolactam. Following the evaporation of water, the ε-caprolactam is distilled to recover high purity ε-caprolactam. Preferably, the distilling is carried out at reduced pressure. Even more preferably, the distillation is effected at a pressure of less than 50 kPa, more preferably less than 20 kPa and most preferably less than 10 kPa. Preferably, the temperature is between 100° C. and 200° C., and more preferably between 110° C. and 180° C. These temperatures refer to the temperature in the bottom of the distillation column in which the distillation is performed.

The distillation includes the separation of low-boiling organic impurities (having a lower boiling point than ε-caprolactam) from ε-caprolactam and/or separating organic high-boiling impurities (having a higher boiling point than ε-caprolactam) from ε-caprolactam. The distillation preferably includes, in a first step, the separating out of low-boiling impurities from ε-caprolactam as a top product and the production of ε-caprolactam-containing high-boiling impurities as a bottom product. In a second step, high purity ε-caprolactam is separated out as a top product and a distillation residue comprising ε-caprolactam and high boiling impurities is obtained as a bottom product.

Therefore, according to a particular advantageous embodiment of the invention, prior to the crystallization in step d)(iv), the purification in step d) also comprises the step of (iii) distillative removal of impurities with lower- or higher-boiling points than ε-caprolactam under vacuum conditions.

Optionally, according to step d)(iii) of the process of the invention, impurities with lower- or higher-boiling points than ε-caprolactam are removed by distillation under vacuum conditions after the crystallization in step d)(iv), whereby a phase comprising ε-caprolactam and impurities is obtained.

Therefore, according to a particular advantageous embodiment of the invention, after the crystallization in step d)(iv), the purification in step d) also comprises the step of (iii) distillative removal of impurities with lower- or higher-boiling points than ε-caprolactam under vacuum conditions.

Optionally, according to step d)(iii) of the process of the invention, impurities with lower- or higher-boiling points than ε-caprolactam are removed by distillation under vacuum conditions both prior to and after the crystallization in step d)(iv), whereby a phase comprising ε-caprolactam and impurities is obtained.

Therefore, according to a particular advantageous embodiment of the invention, both prior to and after the crystallization in step d)(iv), the purification in step d) also comprises the step of (iii) distillative removal of impurities with lower- or higher-boiling points than ε-caprolactam under vacuum conditions.

In a preferred embodiment, prior to the distillative removal in step d)(iii), alkali metal hydroxide, preferably NaOH, is added to the aqueous phase comprising water, ε-caprolactam and impurities with lower- or higher-boiling points than ε-caprolactam. Preferably, the amount of NaOH that is added ranges from 0.5 to 100 mmol, more preferably and most preferably from 2 to 80 mmol per kg ε-caprolactam. Experiments have shown that the addition of an alkali metal hydroxide, in particular NaOH, allows for a particular effective distillative removal of impurities with lower and higher boiling points than ε-caprolactam.

In another preferred embodiment, prior to the distillative removal in step d)(iii), an oxidant, e.g., potassium permanganate, sodium permanganate, and/or hydrogen peroxide, is added to the aqueous phase comprising water, ε-caprolactam and impurities with lower- or higher-boiling points than ε-caprolactam. Most preferably, potassium permanganate is used as oxidant.

The oxidant can be added as solid, as a slurry or in the form of an aqueous solution to the aqueous phase comprising water, ε-caprolactam and impurities with lower- or higher-boiling points than ε-caprolactam, so that a dilute aqueous solution is obtained. The skilled person can determine by routine experimentation the amount of oxidant necessary for efficient oxidation of the aqueous phase comprising water, ε-caprolactam and impurities with lower- or higher-boiling points than ε-caprolactam. The exact amount of oxidant is, amongst others, very much dependent on the composition of the material derived from the nylon 6-containing multi-component material that is used as feed in the process of the invention. Preferably, the amount of oxidant is between 0.01 and 5% by weight relative to the amount of ε-caprolactam dissolved in the to-be-oxidized aqueous phase.

The temperature used for oxidation of the aqueous solution in the process of the invention can vary. Preferably, oxidation of the aqueous solution comprising water, ε-caprolactam and impurities with lower- or higher-boiling points than ε-caprolactam prior to the distillative removal in step d)(iii) with an oxidant is performed at a temperature ranging from 20° C. to 85° C., more preferably ranging from 30° C. to 80° C., wherein the oxidant is selected from the group consisting of potassium permanganate, sodium permangan-ate and hydrogen peroxide and combinations thereof, in particular potassium permanganate.

The length of time used for oxidation with an oxidant can vary. Preferably, oxidation of the aqueous solution comprising water, ε-caprolactam and impurities with lower- or higher-boiling points than ε-caprolactam with an oxidant is performed for 1 minute to 24 hours, more preferably for 2 minutes to 6 hours, and most preferably for 5 minutes to 2 hours.

The concentration of ε-caprolactam in the aqueous phase comprising water, ε-caprolactam and impurities with lower- or higher-boiling points than ε-caprolactam used for oxidation with an oxidant can vary. Preferably, the aqueous solution used for oxidation comprises a weight to weight ratio of ε-caprolactam to water from 5:1 to 1:5, more preferably from 3:1 to 1:3 and most preferably from 2:1 to 1:2. Optionally, prior to the addition of the oxidant to the aqueous phase the weight to weight ratio of ε-caprolactam to water is adapted. Preferably, the weight to weight ratio of ε-caprolactam to water is adapted by either addition of water or by removal of water.

In case potassium permanganate or sodium permanganate is used as oxidant, solid manganese(IV) oxide ($MnO_2$) particles are formed as reaction product. The skilled person can determine by routine experimentation the optimal solid-liquid filtration procedure for efficient removal of solid manganese(IV) oxide particles from the aqueous phase after oxidation. The usage of filter aids, like activated carbon or kieselguhr particles, to improve the filtration procedure are in this regard common practice.

In a preferred embodiment of the invention, prior to the crystallization in step d)(iv), the solution comprising solvent, ε-caprolactam and impurities is hydrogenated in the presence of a hydrogenation catalyst. Preferably, the solvent is water. The hydrogenation catalysts may be any known heterogeneous hydrogenation catalyst. Examples of such catalysts are ruthenium on aluminum oxide, rhodium on aluminum oxide, platinum on carbon, palladium on carbon, Raney nickel, nickel on silica and nickel on aluminum oxide. Preferably, use is made of nickel-containing catalysts. Suitable nickel catalysts as a rule have a nickel content between 5 and 80 wt. %, relative to the metal and the support. Besides nickel the catalyst may contain some activators such as Zr, Mn, Cu or Cr. The activator content is generally between 1 and 20 wt. %. If palladium-containing heterogeneous catalysts are used, the palladium content will generally be between 0.01 and 10 wt. %.

The heterogeneous catalyst can be contacted with the hydrogen-containing reaction mixture in various ways. Hydrogenation may for instance take place in a stirred tank reactor in which the catalyst particles are suspended in the mixture to be purified (slurry phase process). In another embodiment, the hydrogenation is effected in a fixed-bed reactor with the catalyst being fixed in the reactor.

The hydrogenation can be performed in a three-phase system (gas, liquid, solid) that comprises of an aqueous ε-caprolactam mixture, gaseous hydrogen and heterogeneous hydrogenation catalyst. Alternatively, the hydrogenation can be performed in a two-phase system (liquid, solid) that comprises of an aqueous ε-caprolactam mixture, that is completely or partially saturated with hydrogen, and heterogeneous hydrogenation catalyst. Dissolution of the hydrogen in the water-ε-caprolactam mixture to obtain a mixture that is completely or partially saturated with hydrogen can be effected by any process that is known to one skilled in the art.

The hydrogenation temperature is generally between 2° and 160° C. The hydrogenation pressure is generally between 0.1 and 15 MPa.

Hydrogenation of water-ε-caprolactam mixtures is carried out to hydrogenate the unsaturated compounds present in the impure ε-caprolactam. The presence of these unsaturated compounds is disadvantageous because they can impair the physical-mechanical properties of the nylon 6 made by polymerizing ε-caprolactam. The saturated compounds formed by hydrogenation do not adversely influence these physical-mechanical properties of the nylon 6 and moreover these compounds are more easily removed in for example a distillation step and/or a crystallization step following the hydrogenation step.

In step d)(iv) of the process of the invention, purified ε-caprolactam is obtained by crystallization of ε-caprolactam from a solution comprising ε-caprolactam and impurities at a temperature of 10 to 95° C., more preferably at a temperature of 20 to 85° C.

The solution comprising ε-caprolactam and impurities from which purified ε-caprolactam is obtained by crystallization is the organic phase comprising the organic solvent, ε-caprolactam and impurities, that is optionally washed with water or with an aqueous alkaline solution, that is obtained by extraction in step d)(i). Preferably, the solution comprising ε-caprolactam and impurities from which purified ε-caprolactam is obtained by crystallization is the aqueous phase comprising water, ε-caprolactam and impurities with lower- or higher-boiling points than ε-caprolactam that is obtained by solvent switching in step d)(ii). More preferably, the solution comprising ε-caprolactam and impurities from which purified ε-caprolactam is obtained by crystallization is the phase comprising ε-caprolactam and impurities that is obtained by distillation under vacuum conditions in step d)(iii).

Preferably, the ε-caprolactam crystallization process in step d(iv) comprises the following steps:
1. a solution comprising ε-caprolactam and impurities is fed into a crystallizer;
2. in the crystallizer conditions are set such that ε-caprolactam crystals and a mother liquid are formed;
3. the ε-caprolactam crystals and the mother liquid are separated;
4. the mother liquid is recycled.

Crystallization can be applied for the production of ε-caprolactam. It is mainly used for its purification potential and/or product recovery to increase yield. All crystallization processes are based on the formation of a solid crystalline phase from a liquid. In a preferred embodiment, the crystallization in step d)(iv) is performed by either solution-crystallization or melt crystallization.

The term solution crystallization is used for crystallization of a compound from a solution that comprises that (impure) compound and to which an auxiliary solvent is added. The auxiliary solvent is water or a non-aqueous solvent. In case the auxiliary solvent is water then the amount of water in the solution can be chosen within wide ranges, preferably the amount of water ranges from 0.5 to 25 wt. %, more preferably from 1 to 9 wt. %. The crystallization temperature can be chosen within wide ranges, preferably, the crystallization temperature ranges from 10 to 95° C., more preferably from 20 to 85° C., even more preferably, the crystallization temperature ranges from 20 to 70° C., most preferably from 30 to 65° C. The crystallized purified ε-caprolactam is recovered from the slurry at a slurry concentration of preferably ranging from 5 to 75 wt. %, more preferably ranging from 10 to 70 wt. %, most preferably ranging from 15 to 50 wt. %. In case the auxiliary solvent is a non-aqueous solvent then the amount of non-aqueous solvent in the solution can be chosen within wide ranges, preferably the amount of non-aqueous solvent ranges from 5 to 95 wt. %, more preferably from 10 to 90 wt. %, most preferably from 30 to 70 wt. %. The crystallization temperature can be chosen within wide ranges, preferably, the crystallization temperature ranges from 10 to 95° C., more preferably from 20 to 85° C., even more preferably, the crystallization temperature ranges from 20 to 70° C., most preferably from 30 to 65° C. The crystallized purified ε-caprolactam is recovered from the slurry at a slurry concentration of preferably from 5 to 75 wt. %, more preferably from 10 to 70 wt. %, most preferably from 15 to 50 wt. %. Examples of non-aqueous solvents include alkanes (like n-hexane, n-heptane, iso-octane, cyclohexane), alcohols (like methanol, ethanol, n-propanol, n-butanol), aromatic hydrocarbons (like benzene, toluene, o-xylene, m-xylene, p-xylene), ammonia, chlorinated hydrocarbons (like tetrachloromethane, chloroform or ethyl chloride), ketones (like acetone or methyl ethyl ketone) and esters (like ethyl acetate), and mixtures of these solvents. Among them, cyclohexane is preferable.

Solution crystallization is usually performed under atmospheric pressure, but may be performed under reduced pressure or under pressurized conditions. In case of solution crystallization the product is crystallized by evaporative crystallization, whereby the solvent is evaporated, or by cooling crystallization, whereby the cooling is obtained by direct cooling, indirect cooling or vacuum cooling, or by a combination of these methods. After the crystallization step, the formed crystals and the mother liquor are separated by e.g., sedimentation, filtration and/or centrifugation. Optionally, the resulting crystals are washed with e.g., a solvent or solvent mixture with a low impurity content. Optionally, the crystallization-separation sequence is repeated several times. The product is obtained as crystals.

The narrow definition of the term melt crystallization is crystallization of a compound from a solution that comprises that (impure) compound without using an auxiliary solvent. In a wider definition of the term melt crystallization is also applied for crystallization from a solution containing low solvent concentrations. Preferably, the solvent concentration in the solution is less than 25 wt %, more preferably less than 10 wt. %, most preferably less than 5 wt. %. Here, we will use the wider definition of melt crystallization, unless explicitly mentioned otherwise. The compound crystals obtained by melt crystallization are separated from the mother liquor and are optionally washed with the melt of pure compound material. Optionally, the crystallization-separation sequence is repeated several times. Finally, the optionally washed crystals are molten and discharged as a melt or mechanically removed.

Preferably solvent is present in the mixture in the crystallizer, although crystallization can also be conducted without solvent. Many solvents for ε-caprolactam are suitable. Examples of suitable solvents are water, alkanes (like n-hexane, n-heptane, iso-octane, cyclohexane), alcohols (like methanol, ethanol, n-propanol, n-butanol), aromatic hydrocarbons (like benzene, toluene, o-xylene, m-xylene, p-xylene), ammonia, chlorinated hydrocarbons (like tetrachloromethane, chloroform or ethyl chloride), ketones (like acetone or methyl ethyl ketone) and esters (like ethyl acetate). Preferably water and aromatic hydrocarbons are used as solvent, since these solvents give large crystals. Most preferred as solvent is water. The solvent will act as a freezing point depressor for the melt in the crystallizer.

In general, melt crystallization requires less energy than solution crystallization, however operations on an industrial scale can be more challenging.

Melt crystallization as used herein in particular means layer melt crystallization or suspension melt crystallization. These two types of technical processes for melt crystallization are characterized by (1) formation of a crystal layer on a heat exchanger wall (layer melt crystallization) and (2) crystals that grow in suspension (suspension melt crystallization). In general, the operation of a process for crystal layer growth on the wall of a heat exchanger is called layer melt crystallization. First, the melt is charged into the crystallizer, then a crystal layer grows on the cooled heat exchanger surface, next the remaining melt that contains impurities that were rejected from the growing crystals, is drained off from the crystallizer and thereafter the crystal layer is melted and the purified product is recovered. The purification efficiency can be further improved by e.g., sweating a.k.a. partial melting, i.e., mildly heating up the crystal layer to nearly its melting temperature causing draining off of entrapped and adherent impure mother liquor. Layer melt crystallization processes are operated in a batch-wise mode. Well-known examples of processes that are based on layer melt crystallization are the ProABD process by BEFS Prokem and the Sulzer Chemtech process.

Layer melt crystallization can be performed either in a static or a dynamic mode. In the static crystallization mode, crystals are grown onto the cooling surface from a stagnant melt. At the static mode, the desired compound is crystallized batchwise on a heat exchanger wall from a stagnant melt in a closed vessel. This type of crystallization is characterized by low growth rates of the crystals and as a consequence of that long residence (or batch) times. Preferably, the crystallization time ranges from 1 hour to 75 hours, more preferably, from 2 hours to 50 hours, most preferably from 4 hours to 24 hours. After the crystallization step, the remaining melt is drained off. Then, optionally a sweating phase in introduced to remove impurities that are either adhered to the crystals or are entrapped in the crystals. Finally, the crystals are melted completely and drained off or are mechanically removed.

In general, dynamic crystallization is performed in a tube-and-shell heat exchanger, whereby the melt is circulated downward the cooling surface where the compound crystallizes. In general, the melt is pumped through the tubes and the crystals grow on the inside of the tubes, while the cooling medium is flowing on the outside of the tubes. The thickness of the crystal layer increases in time. After a certain period of time the circulation of melt is stopped and the remaining melt is drained off. Dynamic layer crystallization is like stagnant layer crystallization also performed in a batch-wise mode. The crystal growth rates are higher in the dynamic mode compared to the stagnant mode and as a consequence the crystallization times are shorter. Preferably, the crystallization time ranges from 0.05 hour to 12 hours, more preferably, from 0.1 hour to 6 hours, most preferably from 0.3 hours to 3 hours. Then, optionally a sweating phase is introduced to remove impurities that are either adhered to the crystals or are entrapped in the crystals. Finally, the crystals are melted completely and drained off or are mechanically removed.

The suspension melt crystallization can be performed either in a batch or in a continuous mode. With suspension melt crystallization, the melt is cooled below its saturation temperature and crystals start to grow (optionally, after addition of nuclei). The growth rate of the crystals is controlled by the supersaturation temperature of the melt. Suspension melt crystallization can be performed in any exchanger type or vessel type crystallizer that allows cooling of the melt. Preferably, suspension melt crystallization is performed in a scraped surface crystallizer. Optionally, after the crystallization, the resulting mixture of crystals and mother liquor is separated by filtration. Optionally, after the crystallization, the resulting mixture of crystals of the desired compound and mother liquor is charged to a so-called wash column. In a wash column the mother liquor is filtered or drained from the crystals, whereafter, in general, the crystals are washed with purified compound material.

After an ε-caprolactam crystallization step a mother liquor is obtained that comprises next to impurities still ε-caprolactam. Methods to recover ε-caprolactam from this type of mother liquors are well known to the person skilled in the art. And as a result of these recovery methods almost all ε-caprolactam present in the mother liquors can be recovered and converted into high purity ε-caprolactam. One possible solution, in case of multi-stage crystallization, is to recycle mother liquors in a counter-current manner, i.e., mother liquor obtained in the $n^{th}$ crystallization stage is charged to the feed of the $(n-1)^{th}$ crystallization stage. In general, mother liquor obtained from the $1^{rst}$ crystallization stage is charged to an upstream (purification) unit of the process or to a dedicated mother liquor processing unit (e.g., based on distillation or crystallization). After ε-caprolactam crystallization, it may be necessary to purify the obtained mother liquor (or part of it) by, for example, recycling it to any stage prior in the process. Alternatively, mother liquors can be purified, for example, by means of distillation, before being recharged to an ε-caprolactam crystallization step.

The high purity ε-caprolactam obtained according to the process of the invention can be used to make nylon 6 using processes well-known to the skilled person. This nylon 6 may then be used in all known materials, including engineering materials, fibers and films. This nylon 6 that is produced from material derived from nylon 6-containing multi-component material is especially suitable for high speed spinning applications, including garments containing spandex (also known as elastane).

The Plant

The invention also provides a plant, i.e., a chemical plant, comprising a depolymerization section [B], a recovery section [C], and a purification section [D], which is configured to carry out the above-described process of the invention. All plant features specifically described in connection with the plant below also correspond to specific embodiments of the process of the invention and vice versa. Thus, the plant is suitable for carrying out the process of the invention and it is to be understood that what has been described in connection with the process of the invention equally applies to the plant embodiments.

The plant can be a laboratory setup as in the examples. Preferably, however, the plant is an industrial scale plant. "Industrial scale" means that the plant has a production capacity for ε-caprolactam (i.e., is in principle capable of producing the same in an amount of) of at least 500 tons per year if operated all the time.

The plant of the invention is suitable for the production of purified ε-caprolactam from material derived from nylon 6-containing multi-component material and comprises at least the following three sections: a depolymerization section [B], a recovery section [C], and a purification section [D]. These sections, and thereby the plant, is configured to carry out the process of the invention described above.

In addition, the plant of the invention can comprise a pre-treatment section [A], which can comprise a mechanical size reduction section [β] to fragment matter comprising nylon 6-containing multi-component material into pieces and/or a cleaning section [α] to clean matter comprising nylon 6-containing multi-component material and/or a densification section [γ] to obtain material with an increased bulk density. Cleaning includes both washing and separation of foreign materials from the matter comprising nylon 6-containing multi-component material. The separation of foreign materials can be done both manually (handpicking) and mechanically (e.g., density separation, and magnetic separation). Both manual and mechanical devices, like brushes, can help in the washing process in cleaning section [α]. The washing is preferably carried out by an additional effect of friction. Different types of industrial washing systems are available on the market, like high speed friction washers. The mechanical size reduction section [β] comprises equipment for the mechanical fragmentation of the matter comprising nylon 6-containing multi-component material into pieces. Non-limiting examples of this fragmentation equipment are a cutter, a shredder, a mill, a grinder, and a chipper. The densification section [γ] comprises equipment for the densification of matter comprising nylon 6-containing multi-component material, that are optionally fragmented and/or cleaned. Densification to obtain material with a higher bulk density can be done by several technologies known to the person skilled in the art. Well known examples of densification equipment include electric and hydraulic compactor machines and press machines, and equipment in which the feed is first melted and afterwards solidified by cooling, such as e.g., single screw and double screw extruders.

The pre-treatment section [A] further comprises an extraction section [ω], from which material derived from nylon 6-containing multi-component material is discharged. To this extraction section [ω] is charged matter comprising nylon 6-containing multi-component material that is optionally size reduced and/or cleaned and/or densified. In extraction section [ω] a solid pre-concentrated nylon 6-containing material, which is enriched in nylon 6 as compared to the nylon 6-containing multi-component material is obtained by extracting matter comprising nylon 6-containing multi-component material with one or more solvents as described above. In addition, a solid pre-concentrated non-nylon 6-containing material, which is enriched in non-nylon 6 compounds as compared to the nylon 6-containing multi-component material is obtained by extracting matter comprising nylon 6-containing multi-component material with one or more organic solvents.

The extraction section [ω] comprises means configured for carrying out one or more extraction steps of the following type:
Pre-concentration, in which non-nylon 6 compounds are preferentially extracted from the nylon 6-containing multi-component material (then the obtained pre-concentrated nylon 6-containing material is the non-extracted nylon 6-containing multi-component material, optionally after removal of any adhering solvent);
Pre-concentration, in which nylon 6 compounds are preferentially extracted from the nylon 6-containing multi-component material (then the pre-concentrated nylon 6-containing material is obtained after removal of the solvent from the liquid extract phase comprising solvent and dissolved nylon 6); and
Nylon 6 and non-nylon 6 compounds are preferentially extracted from the nylon 6-containing multi-component material in a sequential manner, i.e., a combination of extractions for non-nylon 6 compounds and nylon 6 is performed sequentially.

The choice of the solvent(s) and the treatment conditions (e.g., temperature, treatment length and amount of solvent relative to the amount of nylon 6-containing multi-component material) are described before.

The extraction section [ω] can comprise one or more pieces of extraction equipment, one or more pieces of solvent recovery and purification equipment, one or more pieces of solid-liquid separation equipment, one or more pieces of drying equipment and one or more pieces of densification equipment.

The extraction equipment is selected from (optionally stirred) mixer extractors, extraction columns, centrifugal extractors, and combinations thereof. Preferably, the matter comprising nylon 6-containing multi-component material is charged to the extraction equipment and treated with the one or more solvents. The resulting liquid-solid mixture is separated into a solid phase (with adhering liquid) and a liquid phase in the solid-liquid separation equipment. Preferably, the solid-liquid separation is done by sedimentation in a settler, filtration in a filter and/or centrifugation in a centrifuge. In a centrifugal extractor the extraction and the solid-liquid separation is done in one piece of equipment.

Optionally, the resulting solid material is washed with e.g., clean solvent. Optionally, the extraction-separation sequence is repeated several times.

The one or more pieces of solvent recovery and purification equipment are used to recover and optionally purify solvent from the liquid phase obtained after the solid-liquid separation. Preferably, the recovery of the solvent is done by evaporation followed by condensation of the vapors, whereby the dissolved material will precipitate. Preferably, the solvent recovery is performed in distillation equipment and or (vacuum) dryers that are equipped with condensers, that are operated either in a continuous, batch-wise or semi-continuous mode.

Preferably, the solvent(s) is(are), optionally after distillation, re-used in a closed loop.

Optionally, the resulting precipitate is washed with e.g., clean solvent.

Preferably, both the solid pre-concentrated non-nylon 6-containing material, which is enriched in non-nylon 6 compounds, and the solid pre-concentrated nylon 6-containing material, which is enriched in nylon 6 are dried before being discharged from the extraction section [ω].

In a preferred embodiment of the invention, the plant further comprises a pre-treatment section [A] that comprises an extraction section [ω], and optionally a mechanical size reduction section [β], and optionally a cleaning section [α] and optionally a densification section [γ].

In a more preferred embodiment of the invention, the plant further comprises a pre-treatment section [A] that comprises a mechanical size reduction section [β], and a cleaning section [α] and optionally a densification section [γ] and an extraction section [ω].

The depolymerization section [B] comprises one or more depolymerization reactors that are operated in series and/or in parallel. The material derived from the nylon 6-containing multi-component material is fed to the reactor as a solid or as a melt, preferably as a melt. This feeding may be achieved by using an extruder, gear pump, or other means known in the art.

During production, a depolymerization reactor is at least partially filled with nylon 6-containing feedstock, residual material, ε-caprolactam (and optionally catalyst). The depolymerization reactor can have any desirable form. Preferred reactor types are stirred and non-stirred bubble column reactors, stirred reactors and extruder type reactors.

The depolymerization reactor must be equipped with facilities for feeding of the material derived from nylon 6-containing multi-component material, and optionally the superheated steam and the catalyst. In addition, the depolymerization reactor is equipped with facilities for discharging the stream comprising ε-caprolactam, and the residual material.

Good contact between the steam and the reactor content is essential for an effective operation. Such contact can be achieved by various means known to the skilled person. As an example, steam can be sparged through the material using a multiplicity of inlets, e.g., using a steam distributor. Even further improved contact can be achieved by including mechanical agitation in the reactor, for example, using a combination of rotating paddles and static fins.

Preferably, depolymerization will be complete in 0.5 to 6 hours.

If superheated steam at high temperatures is not available on a production site, it must be made on-purpose by superheating of available steam from a boiler in a so-called superheater.

The recovery section [C] can comprise one or more (preferably partial) condensers to which an ε-caprolactam comprising stream in the form of a vapor stream comprising ε-caprolactam and water is charged. Such a (partial) condenser can have any desirable form. Preferably, a condenser is a distillation column from which a water-rich phase is obtained as top-product and crude ε-caprolactam as bottom product.

The purification section [D] can comprise one or more pieces of extraction equipment, one or more pieces of solvent switch equipment, an oxidation section, a hydrogenation section, one or more pieces of distillation equipment and a crystallization section, to which the crude ε-caprolactam is charged and from which high purity ε-caprolactam is discharged.

To the extraction equipment crude ε-caprolactam and the organic solvent are charged and an organic phase comprising the organic solvent, ε-caprolactam and impurities, and an aqueous phase comprising water and impurities are discharged. The extraction equipment is selected from mixer-settler extractors, extraction columns, centrifugal extractors, and combinations thereof. Preferably, extraction equipment is a static or an agitated extraction column, like KARR® columns, SCHEIBEL® columns, rotating disc contactors (RDC), pulsed columns, sieve trays (static) columns, random packing (static) columns, and structured packing (SMVP) (static) columns.

To the solvent switch equipment water and an organic phase comprising the organic solvent, ε-caprolactam and impurities are charged and an organic solvent and an ε-caprolactam-water phase comprising water, ε-caprolactam, and impurities are discharged. The solvent switch equipment for processes based on back-extraction is selected from mixer-settler extractors, extraction columns, centrifugal extractors, and combinations thereof. Preferably, equipment for back-extraction is a static or an agitated extraction column, like KARR® Columns, SCHEIBEL® Columns, rotating disc contactors (RDC), pulsed columns, sieve trays (static) columns, random packing (static) columns, and structured packing (static) columns.

The solvent switch equipment for processes based on solvent swap distillation is selected from sieve trays distillation columns, random packing distillation columns, and structured packing distillation columns. Preferably, the distillation column is equipped with a reboiler, a condenser and equipment for reflux. The distillation column can be operated at atmospheric pressure, sub-atmospheric pressure or super-atmospheric pressure. Preferably, water is charged to the upper part of the distillation column and the aqueous phase comprising water, ε-caprolactam and impurities with lower- or higher-boiling points than ε-caprolactam is discharged from the lower part of the distillation column.

The oxidation section comprises one or more oxidation reactors that are operated in series and/or in parallel. An oxidant and the ε-caprolactam-water phase comprising water, ε-caprolactam and impurities are charged to the oxidation section. Usually, the oxidant is charged as solid, as a slurry or as an aqueous solution. In case potassium or sodium permanganate is applied as oxidant, the oxidation section also comprises a filtration section. In the filtration section, the formed solid $MnO_2$ particles are separated from the oxidized ε-caprolactam-water phase. The oxidation reactor can have any desirable form. Preferred reactor types are stirred and non-stirred reactors and packed column type reactors. The oxidation reactor must be equipped with facilities for feeding of the aqueous phase comprising water, ε-caprolactam and impurities with lower- or higher-boiling points than ε-caprolactam, and the oxidant. In addition, the oxidation reactor must be equipped with facilities for discharging the oxidized ε-caprolactam-water phase comprising water, ε-caprolactam and impurities, and optionally formed solid manganese(IV) oxide ($MnO_2$) particles. Preferably, the oxidation is performed at a temperature ranging from 20° C. to 85° C. and at atmospheric conditions.

The optionally present solid manganese(IV) oxide ($MnO_2$) particles can be removed by settling or by solid-liquid filtration, preferably by solid-liquid filtration. The usage of filter aids, like activated carbon particles or kieselguhr, to improve the filtration procedure are common practice. Filter systems suitable for the separation of solid manganese(IV) oxide particles are known to the skilled person. To such a filter system a suspension of the oxidized ε-caprolactam-water phase comprising the water, ε-caprolactam and impurities, and the solid manganese(IV) oxide particles are charged and the filtered oxidized ε-caprolactam-water phase comprising the water, ε-caprolactam and impurities is discharged. Generally, the solid manganese(IV) oxide particles are retained in the filter system. Preferably, such a filter system is operated in a semi-continuous mode, whereby the suspension and the filtered phase are continuously charged and continuously discharged, while the separated solids are collected in the filter system. From time to time, the charging of the suspension is interrupted and the collected solids are removed from the filter system.

The purification of the crude ε-caprolactam to obtain purified ε-caprolactam in step d) can comprise a hydrogenation with a heterogeneous catalyst, in which case the plant will comprise a hydrogenation section. Preferably, the catalyst comprises nickel or palladium.

The hydrogenation section comprises one or more hydrogenation reactors that are operated in series and/or in parallel. The hydrogenation can be performed in a three-phase system (gas, liquid, solid) that consists of an aqueous ε-caprolactam mixture, gaseous hydrogen and heterogeneous hydrogenation catalyst. Alternatively, the hydrogenation can be performed in a two-phase system (liquid, solid) that consists of an aqueous ε-caprolactam mixture, that is completely or partially saturated with hydrogen, and heterogeneous hydrogenation catalyst. Dissolution of the hydrogen in the water-ε-caprolactam mixture can be effected by any process that is known to one skilled in the art. Preferably, the mixture is contacted with hydrogen in an absorber or in a mixer in which a constant hydrogen pressure is maintained. Intensive contact between the hydrogen and the mixture will ensure that the hydrogen dissolves in the mixture. Such a process is preferably carried out continuously. The hydrogen-containing mixture is subsequently contacted with the hydrogenation catalyst for example in a separate reactor.

The heterogeneous catalyst can be contacted with the hydrogen-containing reaction mixture in various ways. Hydrogenation may for instance take place in a stirred tank reactor in which the catalyst particles are suspended in the mixture to be hydrogenated (slurry phase process). In such a slurry phase process the catalyst particles and the purified mixture must be separated in an additional process step after the hydrogenation reaction, for instance by means of filtration. Preferably, the catalyst comprises palladium or nickel.

Alternatively, the hydrogenation can be effected in a fixed-bed reactor with the catalyst being fixed in the reactor, so that the additional step for separation of the catalyst and reaction mixture can be dispensed with. Preferably, the fixed bed is consisting of a supported palladium or nickel catalyst.

The hydrogenation temperature is generally between 2° and 160° C. The hydrogenation pressure is generally between 0.1 and 15 MPa.

To the distillation equipment the ε-caprolactam-water phase comprising water, ε-caprolactam and impurities are charged and high purity ε-caprolactam, water, and impurities (i.e., low-boiling organic impurities (having a lower boiling point than ε-caprolactam) and organic high-boiling impurities (having a higher boiling point than ε-caprolactam)) are discharged. The distillation equipment is selected from sieve trays distillation columns, random packing distillation columns, structured packing distillation columns, and horizontal and vertical (falling and climbing) film evaporators. Preferably, the distillation columns are equipped with a reboiler, a condenser, and equipment for reflux. The distillation equipment can be operated at atmospheric pressure, sub-atmospheric pressure or super-atmospheric pressure, preferably at sub-atmospheric pressure.

Preferably, the distillation includes the separation of water, low-boiling organic impurities (having a lower boiling point than ε-caprolactam) and/or organic high-boiling impurities (having a higher boiling point than ε-caprolactam) from ε-caprolactam. Preferably, the distillation includes, in a first step, the separating out of water as a top product and the production of ε-caprolactam-containing low-boiling impurities and high-boiling impurities as a bottom product. In a second step, low-boiling impurities are separated out as top product and ε-caprolactam-containing high-boiling impurities is obtained as a bottom product. In a third step, high purity ε-caprolactam is separated out as a top product and as a bottom product a distillation residue comprising ε-caprolactam and high boiling impurities is produced. Optionally, the first step and the second step are combined.

Preferably, prior to the distillative removal of water and impurities, alkali metal hydroxide, preferably NaOH, is added to the oxidized ε-caprolactam-water phase comprising water, ε-caprolactam and impurities. Preferably, the amount of NaOH that is added ranges from 0.5 to 100 mmol per kg ε-caprolactam, and more preferably from 2 to 80 mmol per kg ε-caprolactam. This leads to a particularly effective distillative removal of impurities with lower and higher boiling points than ε-caprolactam in the subsequent distillation.

The crystallization section comprises one or more crystallizers that are operated in series and/or in parallel. In general, a crystallization section also comprises several vessels to store (intermediate) product streams and/or fresh and used washing liquids. Crystallization of ε-caprolactam can be done by either solution crystallization or melt crystallization, as described before.

In case of solution crystallization ε-caprolactam is recovered by evaporative crystallization, whereby the solvent is evaporated, or by cooling crystallization, whereby the cooling is obtained by direct cooling, indirect cooling or vacuum cooling, or by a combination of these methods. After the crystallization step in a crystallizer, the formed crystals and the mother liquor are separated by e.g., sedimentation in a settler, filtration in a filter and/or centrifugation in a centrifuge. Optionally, the crystallizer is equipped with an agitator and/or one or more baffles.

Optionally, the resulting crystals are washed with e.g., clean solvent or a saturated aqueous solution of ε-caprolactam. Optionally, the crystallization-separation sequence is repeated several times. The product is obtained as crystals.

The auxiliary solvent is water or a non-aqueous solvent. Examples of non-aqueous solvents include alkanes (like n-hexane, n-heptane, iso-octane, cyclohexane), alcohols (like methanol, ethanol, n-propanol, n-butanol), aromatic hydrocarbons (like benzene, toluene, o-xylene, m-xylene, p-xylene), ammonia, chlorinated hydrocarbons (like tetrachloromethane, chloroform or ethyl chloride), ketones (like acetone or methyl ethyl ketone) and esters (like ethyl acetate), and mixtures of these solvents. In general the auxiliary solvent is recovered and re-used in the crystallization process.

Solution crystallization is usually performed under atmospheric pressure, but may be performed under reduced pressure or under pressured conditions.

Melt crystallization of ε-caprolactam can be done by either layer melt crystallization, whereby an ε-caprolactam-containing crystal layer is formed on a heat exchanger wall, or by suspension melt crystallization, whereby ε-caprolactam-containing crystals grow in suspension.

Preferably solvent is present in the mixture in the melt crystallizer, although melt crystallization can also be conducted without solvent. Many solvents for ε-caprolactam are suitable. Examples of suitable solvents are water, alkanes (like n-hexane, n-heptane, iso-octane, cyclohexane), alcohols (like methanol, ethanol, n-propanol, n-butanol), aromatic hydrocarbons (like benzene, toluene, o-xylene, m-xylene, p-xylene), ammonia, chlorinated hydrocarbons (like tetrachloromethane, chloroform or ethyl chloride), ketones (like acetone or methyl ethyl ketone) and esters (like ethyl acetate). Preferably water and aromatic hydrocarbons are used as solvent, since these solvents give large crystals. Most preferred as solvent is water. The solvent will act as a freezing point depressor for the melt in the crystallizer.

Layer Melt Crystallization:

First, the melt is charged into the crystallizer, then a crystal layer grows on the cooled heat exchanger surface, next the remaining melt that contains impurities, that were rejected from the growing crystals, is drained off from the crystallizer and thereafter the crystal layer is melted and the purified product is recovered. The purification efficiency can be further improved by e.g., sweating a.k.a. partial melting, i.e., mildly heating up the crystal layer to nearly its melting temperature causing draining off of entrapped and adherent impure mother liquor. Layer melt crystallization processes are operated in a batchwise mode. Well-known examples of processes that are based on layer melt crystallization are the ProABD process by BEFS Prokem and the Sulzer Chemtech process.

Layer melt crystallization can be performed either in a static or a dynamic mode. In the static crystallization mode, crystals are grown onto the cooling surface from a stagnant melt. At the static mode, the desired compound is crystallized batchwise on a heat exchanger wall from a stagnant melt in a closed vessel. This type of crystallization is characterized by low growth rates of the crystals and as a consequence of that long residence (or batch) times. Preferably, the crystallization time ranges from 1 hour to 75 hours, more preferably, from 2 hours to 50 hours, most preferably from 4 hours to 24 hours. After the crystallization step, the remaining melt is drained off. Then, optionally a sweating phase is introduced to remove impurities that are either adhered to the crystals or are entrapped in the crystals. Finally, the crystals are melted completely and drained off or are mechanically removed.

In general, dynamic crystallization is performed in a tube-and-shell heat exchanger, whereby the melt is circulated downward the cooling surface where the compound crystallizes. In general, the melt is pumped through the tubes and the crystals grow on the inside of the tubes, while the cooling medium is flowing on the outside of the tubes. The thickness of the crystal layer increases in time. After a certain period of time the circulation of melt is stopped and the remaining melt is drained off. Dynamic layer crystallization is like stagnant layer crystallization also performed in a batch-wise mode. The crystal growth rates are higher in the dynamic mode compared to the stagnant mode and as a consequence the crystallization times are shorter. Preferably, the crystallization time ranges from 0.05 hour to 12 hours, more preferably, from 0.1 hour to 6 hours, most preferably from 0.3 hours to 3 hours. Then, optionally a sweating phase is introduced to remove impurities that are either adhered to the crystals or are entrapped in the crystals. Finally, the crystals are melted completely and drained off or are mechanically removed.

Suspension Melt Crystallization:

Suspension melt crystallization of ε-caprolactam can be performed either in a batch or in a continuous mode. With suspension melt crystallization, the melt is cooled below its saturation temperature and ε-caprolactam crystals start to grow (optionally, after addition of nuclei). The growth rate of the crystals is controlled by the supersaturation temperature of the melt. Suspension melt crystallization can be performed in any exchanger type or vessel type crystallizer that allows cooling of the melt. Preferably, suspension melt crystallization is performed in a scraped surface crystallizer. Optionally, after the crystallization, the resulting mixture of crystals and mother liquor is separated by filtration. Optionally, after the crystallization, the resulting mixture of ε-caprolactam crystals and mother liquor is charged to a so-called wash column. In a wash column the mother liquor is filtered or drained from the ε-caprolactam crystals, whereafter, in general, the ε-caprolactam crystals are washed with purified ε-caprolactam.

The process of the invention can be operated in a continuous, semi-continuous or batch-wise fashion. Accordingly, also the plant of the invention can be configured to allow for one or more of these operating modes. In a preferred embodiment, the plant is configured to operate the process of the invention in a continuous or semi-continuous fashion. However, a discontinuous process is also possible. For example, the plant of the invention does not need to contain all sections described herein in one location. In particular, the pre-treatment section [A] can be located at a first location, while the depolymerization section [B], the recovery section [C] and the purification section [D] are located at a second location. Similarly, also a mechanical size reduction section [β], as part of the pre-treatment section [A], can be located at a first location, while a cleaning section [α], as part of pre-treatment section [A] can be located at a second location, while an extraction section [ω], as part of pre-treatment section [A] can be located at a third location, while the depolymerization section [B], the recovery section [C] and the purification section [D] are located at a fourth location. Optionally, the cleaning section [α] is split in two or more segments that are optionally all located at different locations. E.g., a first segment of cleaning section [α], as part of pre-treatment section [A] can be located at a first location, a mechanical size reduction section [β], as part of the pre-treatment section [A], can be located at a second location, while a second segment of cleaning section [α], as part of pre-treatment section [A] can be located at a third location, while the extraction section [ω], as part of pre-treatment section [A] is located at a fourth location, while the depolymerization section [B], the recovery section [C] and the purification section [D] are located at a fifth location. Optionally, the extraction section [ω], as part of pre-treatment section [A] is split in two or more segments that are optionally all located at different locations. Optionally, the extraction section [ω], as part of pre-treatment section [A] is located at the same location than the depolymerization section [B]. Optionally, the depolymerization section [B], is located at a different location than pre-treatment section [A] and/or the recovery section [C] and the purification section [D].

The Product

The invention provides as new product ε-caprolactam obtained via depolymerization of nylon 6 that is produced from material derived from nylon 6-containing multi-component material according to the process of the invention. This ε-caprolactam is advantageously characterized in particular by having a product carbon footprint of less than 2.5 kg $CO_2$ per kg purified ε-caprolactam. The ε-caprolactam obtained according to the invention may also be referred to as "purified ε-caprolactam". "Purified" as used herein means that the ε-caprolactam is produced from material derived from nylon 6-containing multi-component material according to the process of the invention, which results in it being obtained in purified form. In this sense, the ε-caprolactam is obtained and purified from material derived from nylon 6-containing multi-component material.

The process of the invention allows producing high-purity and therefore high-quality ε-caprolactam, which meets the specification for high demanding applications and at the same time the process is particularly environmentally friendly due to its lowered product carbon footprint and the use of waste as starting material. In preferred embodiments, the ε-caprolactam obtained by the process of the invention fulfils one or more of the following specifications, wherein the parameters and measurement methods are defined as in the Example section herein below:

PAN: max. 5
E290: max. 0.05
VB: max. 0.5 mmol/kg
Alkalinity: max. 0.1 mmol/kg
Acidity: max. 0.1 mmol/kg.

The ε-caprolactam produced by the process of the invention is also particularly economical and environmentally friendly. This is evident from the much lower carbon footprint of the ε-caprolactam produced by the process of the invention as compared to classically produced ε-caprolactam (e.g., by Beckmann rearrangement of cyclohexanone oxime).

The environmental impact of a product is generally expressed as 'product carbon footprint'. The carbon footprint of a product is defined as the total emissions caused by the formation of that product, expressed as ton carbon dioxide equivalent per ton product. The carbon footprint of a product is amongst others depending on the feedstock, auxiliary materials, energy consumption, energy sources, production process and process efficiencies. Quantification of the carbon footprint of a product can be done as described in, e.g., the European Standard EN ISO 14040:2006 ("Environmental management—Life cycle assessment—Principles and framework).

Product carbon footprint calculations can be done both in-house or by external (preferably) certified organizations. These organizations verify and certify the product carbon footprint calculations based on e.g., LCA standard ISO 14040.

J. Hong and X. Xu ("Environmental impact assessment of caprolactam production—a case study in China"; J. of Cleaner production 27 (2012) 103-108; DOI: 10.1016/j.jclepro.2011.12.037) reported that the potential impact of "virgin" ε-caprolactam obtained via Beckmann rearrangement of cyclohexanone oxime on global warming is 7.5 ton $CO_2$ equivalent per ton ε-caprolactam (which is equal to 7.5 kg $CO_2$ equivalent per kg ε-caprolactam), in case coal-based electricity and steam generation are involved. If natural gas-based electricity and steam generation are involved, the potential impact of virgin ε-caprolactam on global warming of the ε-caprolactam production process will be reduced to 6.4 ton $CO_2$ equivalent per ton ε-caprolactam (which is equal to 6.4 kg $CO_2$ equivalent per kg ε-caprolactam).

The product carbon footprint of ε-caprolactam that is obtained according to the process of the invention is much lower than the one of de novo synthesized, or "virgin" ε-caprolactam. The product carbon footprint of the ε-caprolactam that is obtained in the process of the invention is less than 4 kg, more preferably less than 3 kg, and most preferably equal to or less than 2.5 kg $CO_2$ equivalent per kg ε-caprolactam.

BRIEF DESCRIPTION OF THE DRAWINGS

In the following, the invention is described with reference to the Figures, which depict certain embodiments of the invention. The invention, however, is as defined in the claims and as generally described herein. It should not be limited to the embodiments shown for illustrative purposes in the Figures below.

FIG. 2 illustrates two embodiments of the pre-treatment section [A], in which the matter comprising nylon 6-containing multi-component material is cleaned in a cleaning section [α] by removal of foreign materials and by washing with a washing solvent and fragmented in a mechanical size reduction section [β] to obtain cleaned and fragmented pieces of matter comprising nylon 6-containing multi-component material that is afterwards extracted with a solvent in an extraction section [ω] to obtain pre-concentrated material derived from nylon 6-containing multi-component material.

FIG. 3 illustrates two embodiments of the purification section [D], in which crude ε-caprolactam is purified to obtain high purity ε-caprolactam.

DETAILED DESCRIPTION OF THE DRAWINGS

Figure 1:
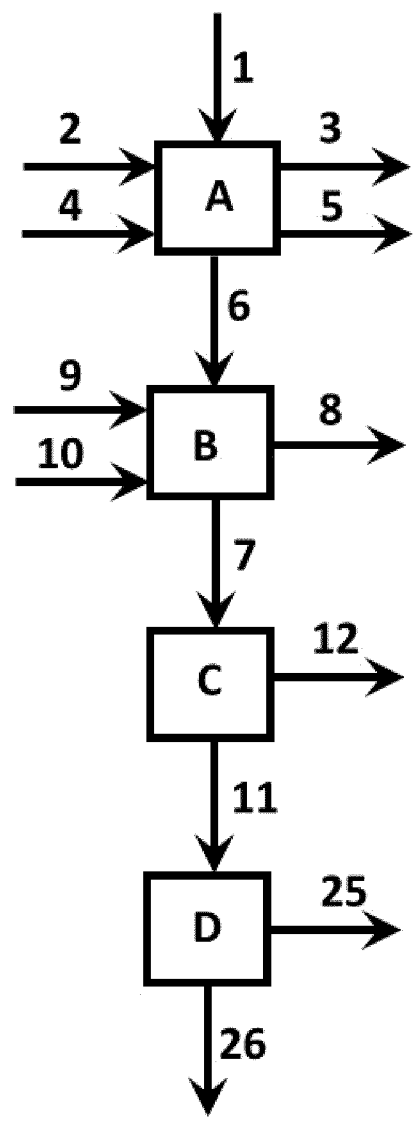
FIG. 1 is a schematic of the process of the invention comprising processing steps performed in an optional or off-site pre-treatment section [A], a depolymerization section [B], a recovery section [C] and a purification section [D].

The process of the invention is schematically illustrated in FIG. 1. The process is carried out in the following plant sections:

Optionally, the nylon 6-containing multi-component material [1] or matter comprising the same is cleaned by removal of foreign materials and by washing with a washing solvent [2] in pre-treatment section [A], whereby foreign materials and contaminated washing solvent [3] are obtained. Optionally, the nylon 6-containing multi-component material [1] or matter comprising the same is fragmented by mechanical size reduction in pre-treatment section [A]. Optionally, foreign materials are removed after the fragmentation. The nylon 6-containing multi-component material or matter comprising the same that is optionally cleaned and fragmented is charged to an extraction section. Optionally, the optionally cleaned and fragmented pieces of nylon 6-containing multi-component material or matter comprising the same are densified before being charged to an extraction section. In the extraction section nylon 6-containing multi-component material is extracted with a solvent [4], whereby non-nylon 6-containing material [5] is discharged. Further, material derived from nylon 6-containing multi-component material [6], which is enriched in nylon 6, is discharged from the pre-treatment section [A] and charged to depolymerization section [B]. Optionally, the material derived from nylon 6-containing multi-component material [6] is densified before being depolymerized to ε-caprolactam in the depolymerization section [B].

The optionally densified material derived from the nylon 6-containing multi-component material [6] is depolymerized to ε-caprolactam in the depolymerization section [B]. An ε-caprolactam comprising stream [7] is discharged from the depolymerization section [B]. In addition, residual material [8] is discharged. Optionally, superheated steam [9] and catalyst [10] are charged to the depolymerization section [B].

Crude ε-caprolactam [11] is recovered from the ε-caprolactam comprising stream [7] that is discharged from the depolymerization section [B] in recovery section [C]. In addition, an aqueous phase [12] is discharged from the recovery section [C] in case water or superheated steam [9] was charged to depolymerization section [B].

Crude ε-caprolactam [11] that is discharged from recovery section [C] is purified to yield high purity ε-caprolactam [26] in purification section [D]. Water and impurities [25] are also discharged from the purification section [D].

Figure 2A:
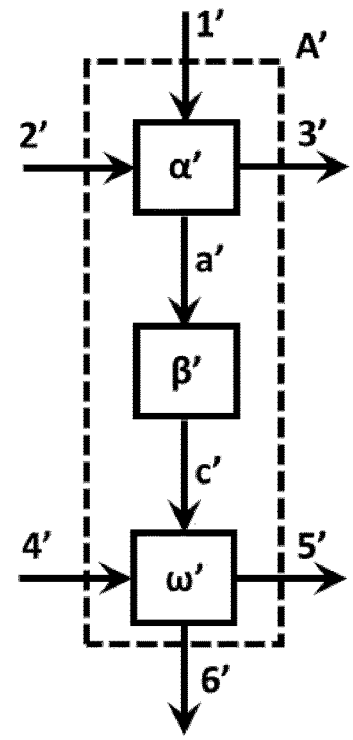
FIG. 2A depicts an embodiment of the pre-treatment section [A'], in which matter comprising nylon 6-containing multi-component material is first cleaned in a cleaning section [α'] by removal of foreign materials and by washing with a washing solvent and then fragmented in a mechanical size reduction section [β'] to obtain cleaned and fragmented pieces of matter comprising nylon 6-containing multi-component material that is afterwards extracted with a solvent in an extraction section [ω'] to obtain material derived from nylon 6-containing multi-component material.

FIG. 2A depicts an embodiment of the pre-treatment section [A'](area enclosed by dashed line), in which the nylon 6-containing multi-component material [1'] is first cleaned in a cleaning section [α'] by removal of foreign materials and by washing with a washing solvent [2'] whereby foreign materials and contaminated washing solvent [3'] and cleaned matter comprising nylon 6-containing multi-component material [a'] is obtained. Subsequently, the cleaned nylon 6-containing multi-component material [a'] is fragmented in a mechanical size reduction section [β'] to obtain cleaned and fragmented pieces of nylon 6-containing multi-component material [c']. The cleaned and fragmented pieces of nylon 6-containing multi-component material are then discharged from a mechanical size reduction section [β'] and charged to an extraction section [ω']. Optionally, the cleaned and fragmented pieces of nylon 6-containing multi-component material are densified before being charged to an extraction section [ω']. In extraction section [ω'] the cleaned and fragmented pieces of nylon 6-containing multi-component material that are optionally densified are extracted with an organic solvent [4'], whereby material derived from nylon 6-containing multi-component material [6'] and non-nylon 6-containing material [5'] are obtained, which are both discharged from extraction section [ω']. The material derived from nylon 6-containing multi-component material [6'] is charged to depolymerization section [B]. Optionally, the material derived from nylon 6-containing multi-component material [6'] is densified before being depolymerized to ε-caprolactam in the depolymerization section [B](not shown in FIG. 2A).

Figure 2B:
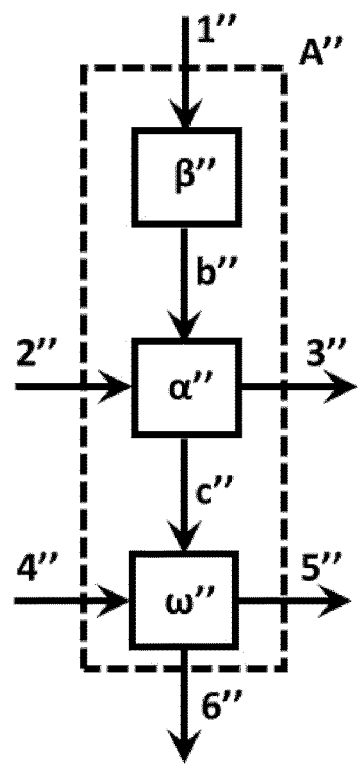
FIG. 2B depicts an embodiment of the pre-treatment section [A"], in which matter comprising nylon 6-containing multi-component material is first fragmented in a mechanical size reduction section [β"] and then cleaned in a cleaning section [α"] by removal of foreign materials and by washing with a solvent to obtain cleaned and fragmented pieces of matter comprising nylon 6-containing multi-component material that is afterwards extracted with a solvent in an extraction section [ω"] to obtain material derived from nylon 6-containing multi-component material.

FIG. 2B depicts an embodiment of the pre-treatment section [A"](area enclosed by dashed line), in which nylon 6-containing multi-component material [1"] is first fragmented in a mechanical size reduction section [β"] to obtain fragmented pieces of nylon 6-containing multi-component material [b"]. Subsequently, the fragmented pieces of nylon 6-containing multi-component material [b"] are cleaned in a cleaning section [α"] by removal of foreign materials and by washing with a washing solvent [2"] to obtain foreign materials and contaminated washing solvent [3"], and cleaned and fragmented pieces of nylon 6-containing multi-component material [c"]. The cleaned and fragmented pieces of nylon 6-containing multi-component material [c"] are then discharged from a cleaning section [α"] and charged to an extraction section [ω"]. Optionally, the cleaned and fragmented pieces of nylon 6-containing multi-component material [c"] are densified before being charged to an extraction section [ω"]. In extraction section [ω"] the cleaned and fragmented pieces of nylon 6-containing multi-component material that are optionally densified are extracted with an organic solvent [4"], whereby material derived from nylon 6-containing multi-component material [6"] and non-nylon 6-containing material [5"] are obtained, which are both discharged from extraction section [ω"]. The material derived from nylon 6-containing multi-component material [6"] is charged to depolymerization section [B]. Optionally, the material derived from nylon 6-containing multi-component material [6"] is densified before being depolymerized to ε-caprolactam in the depolymerization section [B](not shown in FIG. 2B).

Figure 3A:
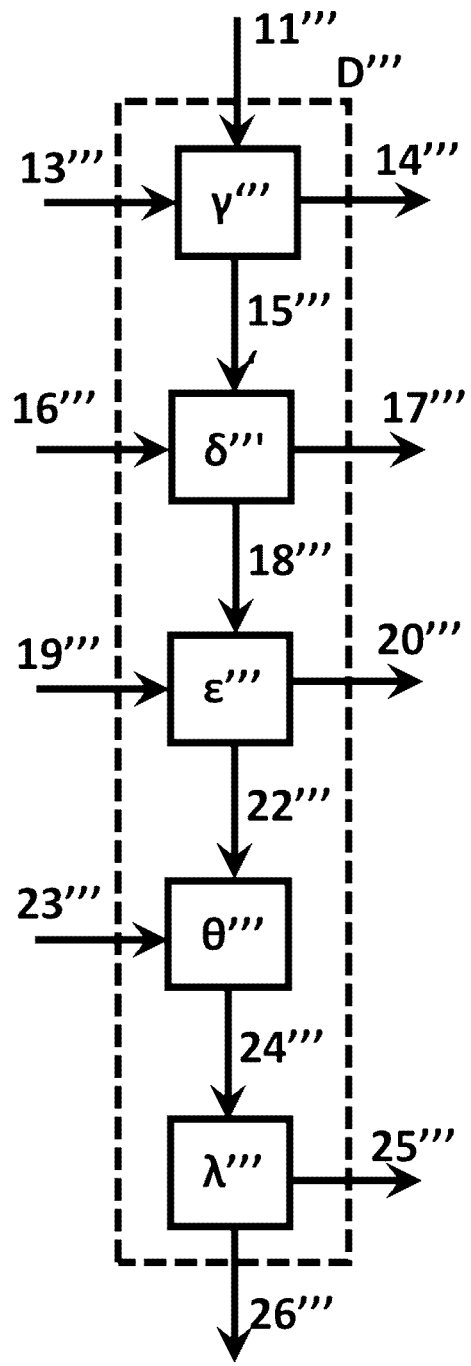
FIG. 3A depicts an embodiment of the purification section [D'''] of the process of the invention, that comprises an extraction section [γ'''], optionally a washing section [δ'''], optionally a back-extraction section [ε'''], optionally a distillation section [θ'''], and a crystallization section [λ'''].

FIG. 3A depicts an embodiment of the purification section [D'''](area enclosed by dashed line), that comprises the following sections:

In the extraction section [γ'''], crude ε-caprolactam [11'''] is extracted with an organic solvent [13'''] to obtain an aqueous phase comprising water and impurities [14'''] and an organic phase comprising the organic solvent, ε-caprolactam and impurities [15''']. Both phases are discharged from the extraction section [γ'''].

In the optional washing section [δ'''], the organic phase comprising the organic solvent, ε-caprolactam and impurities [15'''] is washed with water or an aqueous alkaline solution [16'''] to obtain an aqueous residue-comprising phase [17'''] and a washed organic phase that comprises organic solvent, ε-caprolactam and impurities [18''']. Both phases are discharged from the washing section [δ'''].

In the optional back-extraction section [ε'''], the optionally washed organic phase that comprises the organic solvent, ε-caprolactam and impurities [18'''] is back-extracted with water [19'''] to obtain an organic solvent phase that comprises impurities [20'''] and an aqueous phase comprising water, ε-caprolactam and impurities with lower- or higher-boiling points than ε-caprolactam [22''']. Both phases are discharged from the back-extraction [ε''']. Optionally, residual organic solvent is removed by stripping and/or distillation from the aqueous phase comprising water, ε-caprolactam and impurities with lower- or higher-boiling points than ε-caprolactam [22'''](not shown in FIG. 3A).

Optionally, the aqueous phase comprising water, ε-caprolactam and impurities with lower- or higher-boiling points than ε-caprolactam [22'''], from which optional residual organic solvent has been removed by stripping and/or distillation, is oxidized with an oxidant to obtain an oxidized ε-caprolactam-water phase comprising water, ε-caprolactam, and impurities (not shown in FIG. 3A).

Optionally, the oxidized ε-caprolactam-water phase comprising the water, ε-caprolactam and impurities is filtered to remove solid manganese(IV) oxide particles before being charged to the next section (not shown in FIG. 3A).

Optionally, the aqueous phase comprising water, ε-caprolactam and impurities with lower- or higher-boiling points than ε-caprolactam [22'''], from which optional residual organic solvent has been removed by stripping and/or distillation, is hydrogenated with hydrogen in the presence of a heterogeneous catalyst to obtain a hydrogenated ε-caprolactam-water phase comprising water, ε-caprolactam, and impurities before being charged to the next section (not shown in FIG. 3A).

In optional distillation section [θ'''], the aqueous phase comprising water, ε-caprolactam and impurities with lower- or higher-boiling points than ε-caprolactam [22'''] is distilled to remove impurities with lower- or higher-boiling points than ε-caprolactam and optionally organic solvent or water and whereby is obtained distilled ε-caprolactam phase [24''']. All of the distillation products are discharged from the distillation section [θ''']. Optionally, prior to the distillation in distillation section [θ'''], an alkali metal hydroxide [23'''] is dosed to the ε-caprolactam-water phase comprising water, ε-caprolactam and impurities with lower- or higher-boiling points than ε-caprolactam [22'''].

In crystallization section [λ'''], the optionally distilled ε-caprolactam phase [24'''] is crystallized to remove impurities [25'''] from ε-caprolactam and whereby is obtained high purity ε-caprolactam [26''']. All of the crystallized products are discharged from the crystallization section [λ''']. Optionally, prior to the crystallization of ε-caprolactam a solvent is charged to the crystallization section [λ'''](not shown in FIG. 3A).

Figure 3B:
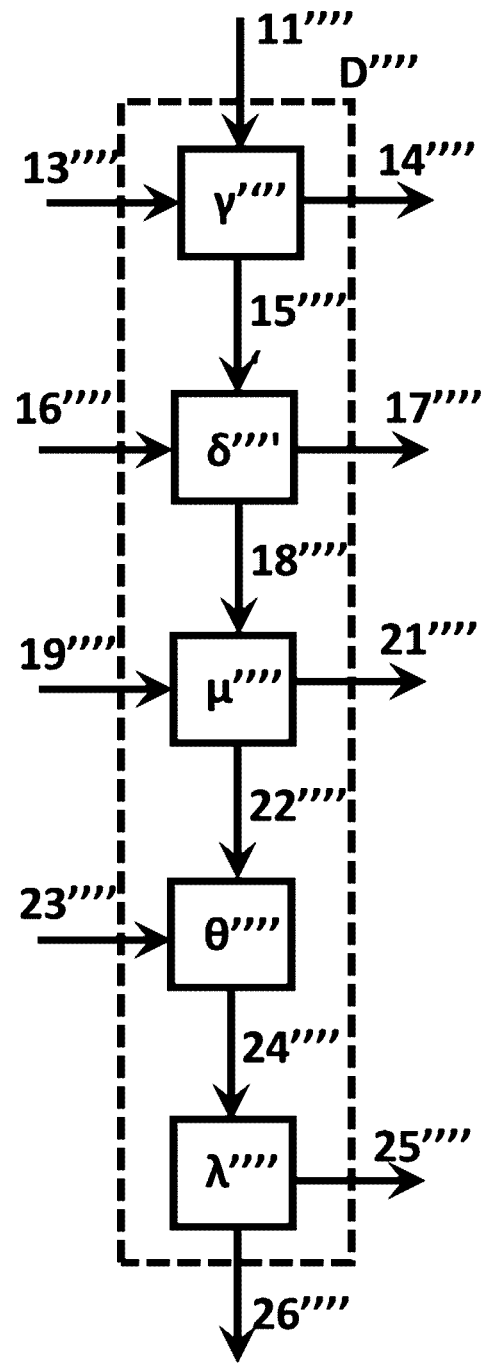
FIG. 3B depicts an embodiment of the purification section [D''''] of the process of the invention, that comprises an extraction section [γ''''], optionally a washing section [δ''''], optionally a solvent swap distillation section [μ''''], optionally a distillation section [θ''''], and a crystallization section [λ''''].

FIG. 3B depicts an embodiment of the purification section [D''''](area enclosed by dashed line), that comprises the following sections:

In the extraction section [γ''''], crude ε-caprolactam [11''''] is extracted with an organic solvent [13''''] to obtain an aqueous phase comprising water and impurities [14''''] and an organic phase comprising the organic solvent, ε-caprolactam and impurities [15'''']. Both phases are discharged from the extraction section [γ''''].

In the optional washing section [δ''''], the organic phase comprising the organic solvent, ε-caprolactam and impurities [15''''] is washed with water or an aqueous alkaline solution [16''''] to obtain an aqueous residue-comprising phase [17''''] and a washed organic phase that comprises organic solvent, ε-caprolactam and impurities [18'''']. Both phases are discharged from the washing section [δ''''].

In the optional solvent swap distillation section [μ''''], the optionally washed organic phase comprising the organic solvent, ε-caprolactam and impurities [18''''] is solvent swap distilled with addition of water [19''''] to obtain organic solvent [21''''] and an aqueous phase comprising water, ε-caprolactam and impurities with lower- or higher-boiling points than ε-caprolactam [22'''']. Both distillation products are discharged from the solvent swap distillation section [μ''''].

Optionally, the aqueous phase comprising water, ε-caprolactam and impurities with lower- or higher-boiling points than ε-caprolactam [22''''], from which optional residual organic solvent has been removed by stripping and/or distillation, is oxidized with an oxidant to obtain an oxidized ε-caprolactam-water phase comprising water, ε-caprolactam, and impurities (not shown in FIG. 3B).

Optionally, the oxidized ε-caprolactam-water phase comprising the water, ε-caprolactam and impurities is filtered to remove solid manganese(IV) oxide particles before being charged to the next section (not shown in FIG. 3B).

Optionally, the aqueous phase comprising water, ε-caprolactam and impurities with lower- or higher-boiling points than ε-caprolactam [22''''], from which optional residual organic solvent has been removed by stripping and/or distillation, is hydrogenated with hydrogen in the presence of a heterogeneous catalyst to obtain a hydrogenated ε-caprolactam-water phase comprising water, ε-caprolactam, and impurities before being charged to the next section (not shown in FIG. 3B).

In optional distillation section [θ''''], the aqueous phase comprising water, ε-caprolactam and impurities with lower- or higher-boiling points than ε-caprolactam [22''''] is distilled to remove impurities with lower- or higher-boiling points than ε-caprolactam and optionally organic solvent and whereby is obtained distilled ε-caprolactam phase [24'''']. All of the distillation products are discharged from the distillation section [θ'''']. Optionally, prior to the distillation in distillation section [θ''''], an alkali metal hydroxide [23''''] is dosed to the ε-caprolactam-water phase comprising water, ε-caprolactam and impurities with lower- or higher-boiling points than ε-caprolactam [22''''].

In crystallization section [λ''''], the optionally distilled ε-caprolactam phase [24''''] is crystallized to remove impurities [25''''] from ε-caprolactam and whereby is obtained high purity ε-caprolactam [26'''']. All of the crystallized products are discharged from the crystallization section [λ'''']. Optionally, prior to the crystallization of ε-caprolactam a solvent is charged to the crystallization section [λ''''](not shown in FIG. 3B).

EXAMPLES

The following examples serve to explain the invention in more detail, in particular with regard to certain forms of the invention. The examples, however, are not intended to limit the present disclosure.

ε-caprolactam, that can be used for all major nylon 6 polymerization applications, without dilution with purer qualities of ε-caprolactam, fulfils all of the following specifications:

PAN: max. 5
E290: max. 0.05
VB: max. 0.5 mmol/kg
Alkalinity: max. 0.1 mmol/kg
Acidity: max. 0.1 mmol/kg The parameters and measurement methods are defined as follows:

PAN: ISO DIS 8660-Plastics-Determination of permanganate index of caprolactam-Spectrometric method, revision of first edition ISO 8660; 1988, E290: ISO 7059-caprolactam for industrial use-determination of absorbance at a wavelength of 290 nm, Volatile bases (VB) ISO 8661-Caprolactam for industrial use-Determination of volatile bases content-Titrimetric method after distillation.

Alkalinity of ε-caprolactam product: the alkalinity is determined by titration at a temperature of 25° C. using a Tashiro indicator in a 1:2 ratio of 0.1 wt./$v_{Ethanol}$% Methylene blue:0.1 wt./$v_{Ethanol}$% Methyl red, which is grey at its end point. A flask containing water and indicator is first titrated to grey, then X grams of an aqueous ε-caprolactam solution containing Y wt. % ε-caprolactam (as determined by refractive index) is added and the solution is titrated back to grey using a 0.01 N $H_2SO_4$ solution (in case the solution is alkaline) or a 0.01 N NaOH solution (in case the solution is acidic).

Alkalinity is then given by:

$$\text{Alkalinity (mmol/kg } \varepsilon\text{-caprolactam} = v * t * 1000/(X * Y)$$

Where:
v=volume of $H_2SO_4$ solution added (ml)
t=normality of $H_2SO_4$ solution (=0.01 N)
X=weight of sample (g)
Y=concentration ε-caprolactam (wt. %)

Acidity is then given by:

$$\text{Acidity (mmol/kg } \varepsilon\text{-caprolactam}) = v * t * 1000/(X * Y)$$

Where:
v=volume of NaOH solution added (ml)
t=molarity of NaOH solution (=0.01 N)
X=weight of sample (g)
Y=concentration ε-caprolactam (wt. %)

The starting material that was used in the Examples 1, 2 and 3 and in the Comparative Examples were waste multi-layered packaging films, comprising layers of polyethylene and nylon 6. The nylon 6 layers were buried in the used waste multi-layered packaging films by being sandwiched in between other layers and therefore not well accessible.

The nylon 6-pre-concentration step a) of the waste multi-layered packaging films is performed by selectively dissolving polyethylene at elevated temperatures in an organic solvent, e.g., white spirit (Sigma-Aldrich; CAS number 68551-17-7) or methylcyclohexane, whereby the resulting mixture comprises undissolved nylon 6 and an organic solution comprising organic solvent and dissolved polyethylene. Undissolved nylon 6 material is obtained after separation of the organic solution from the resulting mixture. The resulting undissolved nylon 6 material can be dried and optionally densified by melting under nitrogen and subsequently converted into solid particles that are enriched in nylon 6 as compared to the nylon 6-containing multi-component starting material.

Example 1

Depolymerization of Nylon 6 and Recovery of ε-Caprolactam.

The material used for depolymerization and the further processing steps as described below can be any nylon 6-containing multi-component material or derivative thereof. The particular material that was used in the following examples was enriched in nylon 6 as compared to nylon 6-containing multi-component starting material and was prepared as described above from waste multi-layered packaging films.

The enriched in nylon 6 starting material was shaped into pearl-like solid particles (diameter: 3 to 4 mm). The polyethylene content in the undissolved nylon 6 material was about 1 wt. % as determined by DSC (Differential Scanning Calorimetry). The color of the nylon 6 starting material was yellow-greenish.

48.1 g of the pearl-like solid particles and 15.0 grams of 20 wt. % phosphoric acid were charged to a Premex high pressure autoclave. First, the reactor content was heated under nitrogen and subsequently superheated steam was injected continuously at a rate of 4 grams per minute during the 120-minute reaction. The temperature and the pressure in the reactor were maintained at 260° C. and 0.11 MPa, respectively. During the reaction a vapor stream was continuously discharged from the reactor.

The obtained vapor stream was cooled to 20° C. in order to recover crude ε-caprolactam from the vapor stream. The condensate that composed of 34.7 grams of ε-caprolactam, most of the remainder being water, was concentrated by evaporation in a rotavap (rotary evaporator) that was operated under vacuum (9.5 kPa; water bath temperature was ca. 65° C.) to an ε-caprolactam concentration of about 54.4 wt. %. (The resulting mixture, crude ε-caprolactam, is the mixture to be purified.)
The specifications of the crude ε-caprolactam were:
PAN: 396
E290: 3.13

This EXAMPLE shows that crude ε-caprolactam with a good yield can be obtained by depolymerization of nylon 6 that originates from discarded nylon 6 waste multi-layered packaging films. Due to the very poor quality, this crude ε-caprolactam cannot be used as-such for all major nylon 6 polymerization applications.

Comparative Experiment 1

Depolymerization of Nylon 6, Recovery of ε-Caprolactam, Extraction, Caustic Wash and Back Extraction.

The depolymerization and recovery procedure of EXAMPLE 1 was followed.

70 gram of crude ε-caprolactam that was obtained in EXAMPLE 1 was extracted one time with 100 gram and nine times with 50 gram solvent mixture 4-methyl-2-pentanol (50 wt. %)/cyclohexane (50 wt. %) at 25° C. The ten resulting ε-caprolactam phases comprising solvent mixtures were combined and washed with 7 gram aqueous caustic solution (2 wt. %). The resulting washed organic extract was concentrated by distillation under vacuum conditions to an ε-caprolactam concentration of about 40 wt. % and then fresh cyclohexane was added. The ε-caprolactam concentration of the resulting mixture was about 25 wt. % and the weight ratio of the solvent mixture 4-methyl-2-pentanol/cyclohexane was 50 wt. %: 50 wt. %. Subsequently, the washed and concentrated ε-caprolactam comprising solvent mixture was extracted six times with 50 gram of water at 25° C. The six resulting aqueous ε-caprolactam phases were combined. The combined aqueous phases were concentrated by evaporation in a rotavap (rotary evaporator) that was operated under vacuum (9.5 kPa; water bath temperature was ca. 65° C.) to an ε-caprolactam concentration of 50.4 wt. %. The specifications of the obtained concentrated aqueous ε-caprolactam solution were:
PAN: 82
E290: 1.17

This COMPARATIVE EXPERIMENT shows that the quality of ε-caprolactam that is obtained from depolymerization of nylon 6 that originates from discarded nylon 6 waste multi-layered packaging films and was purified by extraction, caustic wash and back extraction is very poor as it does not meet any of the required specifications for major polymerization applications.

Comparative Experiment 2

Depolymerization of Nylon 6, Recovery of ε-Caprolactam, Extraction, Caustic Wash, Back Extraction and Oxidation.

The aqueous ε-caprolactam solution which was purified by back extraction that was obtained in COMPARATIVE EXPERIMENT 1 was then treated with 0.04 wt. % $KMnO_4$ with regard to ε-caprolactam at 50° C. for 2 hours. The solids formed were then removed from the oxidized reaction product by means of a filtration. The specifications of the purified ε-caprolactam were:
PAN: 83
E290: 3.01

This COMPARATIVE EXPERIMENT shows that the quality of ε-caprolactam that is obtained from depolymerization of nylon 6 that originates from discarded nylon 6 waste multi-layered packaging films and was purified by extraction, caustic wash, back extraction and oxidation is very poor as it does not meet any of the required specifications for major polymerization applications.

Comparative Experiment 3

Depolymerization of Nylon 6, Recovery of ε-Caprolactam and Distillative Purification.

The procedure of EXAMPLE 1 was followed.

75 mmol of aqueous sodium hydroxide per kg ε-caprolactam was added to the obtained crude ε-caprolactam.

Subsequently, water and impurities with lower boiling points than ε-caprolactam were removed as top products by distillation under reduced pressure in a batch-wise operated distillation set-up. Finally, distilled ε-caprolactam was recovered as top product at 300 Pa, while the impurities with higher boiling points compared to ε-caprolactam remained as bottom product in the distillation set-up. The specifications of the distilled ε-caprolactam were:

PAN: 74
E290: 0.53
VB: 0.72 mmol/kg
Acidity: 7.64 mmol/kg

This COMPARATIVE EXPERIMENT shows that the quality of ε-caprolactam that is obtained from depolymerization of nylon 6 that originates from discarded nylon 6 waste multi-layered packaging films and was purified by distillation is very poor as it does not meet any of the required specifications for major polymerization applications.

Comparative Experiment 4

Depolymerization of Nylon 6, Recovery of ε-Caprolactam and Purification by Distillation and Crystallization.

The procedure of EXAMPLE 1 was followed.

75 mmol of aqueous sodium hydroxide per kg ε-caprolactam was added to the obtained crude ε-caprolactam.

Subsequently, water and impurities with lower boiling points than ε-caprolactam were removed as top products by distillation under reduced pressure in a batch-wise operated distillation set-up. Finally, distilled ε-caprolactam was recovered as top product at 300 Pa, while the impurities with higher boiling points compared to ε-caprolactam remained as bottom product in the distillation set-up.

Then distilled water was added to the distilled ε-caprolactam to obtain a mixture with an ε-caprolactam concentration of 92.3 wt. %. This aqueous ε-caprolactam was introduced in a crystallization set-up at a temperature of 52° C. The aqueous ε-caprolactam was cooled down to 40° C., where crystals started to form. Thereafter, the cooling of the mixture continued down to 30° C., where it was held for 30 minutes. The crystallized ε-caprolactam was recovered by filtration and washed with an 85 wt. % aqueous ε-caprolactam solution. The specifications of the obtained purified ε-caprolactam were:

PAN: 4
E290: 0.07
VB: <0.02 mmol/kg
Alkalinity: 0.21 mmol/kg

This COMPARATIVE EXPERIMENT shows that the quality of ε-caprolactam that is obtained from depolymerization of nylon 6 that originates from discarded nylon 6 waste multi-layered packaging films and was purified by distillation and crystallization is poor as it does not meet all of the required specifications for major polymerization applications.

Example 2

Purification by Extraction, Back-Extraction, Distillation and Crystallization.

70 gram of crude ε-caprolactam that was obtained in EXAMPLE 1 was extracted one time with 100 gram and nine times with 50 gram solvent mixture 4-methyl-2-pentanol (50 wt. %)/cyclohexane (50 wt. %) at 25° C. The resulting organic extracts were concentrated by distillation under vacuum conditions to an ε-caprolactam concentration of about 40 wt. % and then fresh cyclohexane was added. The ε-caprolactam concentration of the resulting mixture was about 25 wt. % and the weight ratio of the solvent mixture 4-methyl-2-pentanol/cyclohexane was 50 wt. %: 50 wt. %. This mixture was 7 times batch-wise extracted with 50 gram water at a temperature of ca. 25° C. The resulting 7 aqueous phases were combined. The combined aqueous phases were concentrated by evaporation in a rotavap (rotary evaporator) that was operated under vacuum (9.5 kPa; water bath temperature was ca. 65° C.) to an ε-caprolactam concentration of 47 wt. %. The specifications of the obtained concentrated aqueous ε-caprolactam solution were:

PAN: 150
E290: 2.15

75 mmol of aqueous sodium hydroxide per kg ε-caprolactam was then added to the concentrated ε-caprolactam solution. Subsequently, water and impurities with lower boiling points than ε-caprolactam were removed as top products by distillation under reduced pressure in a batch-wise operated distillation set-up. Finally, distilled ε-caprolactam was recovered as top product at 300 Pa, while the impurities with higher boiling points compared to ε-caprolactam remained as bottom product in the distillation set-up. The specifications of the distilled ε-caprolactam were:

PAN: 16
E290: 0.18

Then distilled water was added to the distilled ε-caprolactam to obtain a mixture with an ε-caprolactam concentration of 91.4 wt. %. This aqueous ε-caprolactam was introduced in a crystallization set-up at a temperature of 52° C. The aqueous ε-caprolactam was cooled down to 40° C. and 2 mg seeds were added to the mixture. Thereafter, the cooling of the mixture continued down to 30° C., where it was held for 30 minutes. The crystallized ε-caprolactam was recovered by filtration and washed with an 85 wt. % aqueous ε-caprolactam solution. The specifications of the obtained purified ε-caprolactam were:

PAN: 3
E290: 0.03
VB: 0.05 mmol/kg
Alkalinity: 0.02 mmol/kg.

From this EXPERIMENT, it can be concluded that purified ε-caprolactam that meets all the required specifications for major polymerization applications can be obtained from depolymerization of nylon 6 that originates from discarded nylon 6 waste multi-layered packaging films and was purified by extraction, back-extraction, distillation and crystallization.

Example 3

Depolymerization, Recovery, Purification by Extraction, Back-Extraction, Distillation and Crystallization.

The depolymerization and recovery procedure of EXAMPLE 1 was followed.

34 gram of crude ε-caprolactam that was obtained in EXAMPLE 1 was extracted one time with 78 gram and four times with 50 gram benzene at 25° C. The resulting organic extracts were concentrated by distillation under vacuum conditions to an ε-caprolactam concentration of about 25 wt. % This mixture was 3 times batch-wise extracted with 25 gram water at a temperature of ca. 25° C. The specifications of the aqueous ε-caprolactam solution after back-extraction were:

PAN: 83
E290: 1.15

75 mmol of aqueous sodium hydroxide per kg ε-caprolactam was then added to the concentrated ε-caprolactam solution. Subsequently, water and impurities with lower boiling points than ε-caprolactam were removed as top products by distillation under reduced pressure in a batch-wise operated distillation set-up. Finally, distilled ε-caprolactam was recovered as top product at 300 Pa, while the impurities with higher boiling points compared to ε-caprolactam remained as bottom product in the distillation set-up.

Then distilled water was added to the distilled ε-caprolactam to obtain a mixture with an ε-caprolactam concentration of 91.4 wt. %. This aqueous ε-caprolactam was introduced in a crystallization set-up at a temperature of 52° C. The aqueous ε-caprolactam was cooled down to 40° C. and some seeds were added to the mixture. Thereafter, the cooling of the mixture continued down to 30° C., where it was held for 30 minutes. The crystallized ε-caprolactam was recovered by filtration and washed with an 85 wt. % aqueous ε-caprolactam solution. The specifications of the obtained purified ε-caprolactam fulfilled all of the required specifications for major polymerization applications.

From this EXPERIMENT, it can be concluded that purified ε-caprolactam that meets all the required specifications for major polymerization applications can be obtained from depolymerization of nylon 6 that originates from discarded nylon 6 waste multi-layered packaging films and was purified by extraction, back-extraction, distillation and crystallization.

Experiment 4

Calculation of Product Carbon Footprint of Purified ε-Caprolactam.

A continuous process according to the invention for the production on industrial scale of purified ε-caprolactam from waste multi-layered packaging films, comprising layers of polyethylene and nylon 6 was simulated. The nylon 6 content of these waste multi-layered packaging films, comprising layers of polyethylene and nylon 6 was 20 wt. %. The process included:

Cutting waste multi-layered packaging films, comprising layers of polyethylene and nylon 6 in small pieces;
Washing with water of the small pieces of waste multi-layered packaging films, comprising layers of polyethylene and nylon 6;
Drying by centrifugation of the washed small pieces of waste multi-layered packaging films, comprising layers of polyethylene and nylon 6;
Extraction of polyethylene with white spirit;
Separation of non-dissolved solid pre-concentrated nylon 6-containing material by centrifugation;
Washing of non-dissolved solid pre-concentrated nylon 6-containing material with water;
Separation of washed non-dissolved solid pre-concentrated nylon 6-containing material and aqueous extract by centrifugation;
Decolorization of the polyethylene comprising white spirit solution by treatment with active carbon;
Recovery of polyethylene from the polyethylene comprising white spirit solution by cooling and partial evaporation of the white spirit;
Melting and pelletization of recovered polyethylene;
Melting and pelletization of washed non-dissolved solid pre-concentrated nylon 6-containing material;
Depolymerization of nylon 6 in the pelletized nylon 6-containing material under influence of $H_3PO_4$ and superheated steam;
Recovery of crude ε-caprolactam (80 wt. % ε-caprolactam) by partial condensation of vapors discharged from depolymerization reactor;
Counter-current extraction of concentrated crude ε-caprolactam with toluene;
Counter-current back-extraction of washed organic extract with water;
Evaporative concentration of aqueous extract;
Distillative removal of lights and heavies by vacuum distillation; and
Recovery of pure ε-caprolactam by melt crystallization at a temperature of 61° C.

The carbon footprint of purified ε-caprolactam was calculated based on the consumption figures of raw materials, and utilities of the above described process are based on data originating from ecoinvent version 3.7.1.

The outcome revealed that the product carbon footprint of purified ε-caprolactam obtained from nylon 6-containing multi-component material is less than 2.5 tons $CO_2$ eq./ton of ε-caprolactam (location Europe).

The main products of this process are polyethylene and pure ε-caprolactam. The pure ε-caprolactam recovery yield is about 0.8 kg pure ε-caprolactam per kg nylon 6 in the waste multi-layered packaging films, comprising layers of polyethylene and nylon 6. The obtained by-products are incinerated with energy recovery.

The product carbon footprint of purified ε-caprolactam was calculated based on the consumption figures of raw materials, and utilities of the above described process are based on data originating from ecoinvent version 3.7.1. The distribution of the environmental impact between the products purified ε-caprolactam and polyethylene in the nylon 6-pre-concentration section was based on the weight ratio of these products.

The outcome revealed that the product carbon footprint of purified ε-caprolactam obtained from multi-layered packaging films, comprising layers of polyethylene and nylon 6 is less than 2.5 ton $CO_2$ eq./ton of ε-caprolactam (location: Europe).

The invention claimed is:

1. A process for recovering purified ε-caprolactam from material derived from nylon 6-containing multi-component material in a plant, wherein the plant comprises
a depolymerization section [B],
a recovery section [C], and
a purification section [D],
and wherein the process comprises the steps of:
a) providing a pre-concentrated nylon 6-containing material that has been obtained by extracting a nylon 6-containing multi-component material with one or more solvents to obtain a solid pre-concentrated nylon 6-containing material, which is enriched in nylon 6 as compared to the nylon 6-containing multi-component material, and charging said pre-concentrated material derived from nylon 6-containing multi-component material to the depolymerization section [B];
b) depolymerizing the material derived from nylon 6-containing multi-component material in the depolymerization section [B] at a temperature ranging from 180° C. to 400° C., so that an ε-caprolactam comprising stream is obtained;
c) discharging the ε-caprolactam comprising stream from the depolymerization section [B] and recovering crude ε-caprolactam from said stream in the recovery section [C]; and
d) purifying said crude-caprolactam in the purification section [D] to obtain purified ε caprolactam wherein the purification comprises the steps of (i) extracting the crude ε-caprolactam with an organic solvent, whereby an organic phase is obtained, and wherein the organic phase comprises the organic solvent, ε-caprolactam and impurities; and (ii) a) solvent switching based on back-extraction with water; or (ii) b) solvent switching based on solvent swap distillation; and (iii) distillative removal of impurities with lower- or higher-boiling points than ε-caprolactam under vacuum conditions; and (iv) obtaining purified ε-caprolactam by crystallization of ε-caprolactam from a solution comprising ε-caprolactam and impurities at a temperature of 10 to 95° C.;

and wherein the nylon 6-containing multi-component material is or comprises a) a multi-layer film that contains at least one layer comprising or consisting of nylon 6 and at least one layer comprising or consisting of a polyolefin, b) a multi-layer film that contains at least one layer comprising or consisting of nylon 6 and at least two layers comprising or consisting of a polyolefin, wherein the at least one layer comprising or consisting of nylon 6 is sandwiched in between two or more layers comprising or consisting of a polyolefin, and/or c) a multi-component material comprising nylon 6 and at least one polyolefin, wherein the nylon 6 is present in the nylon 6-containing multi-component material as a separate domain and/or as a mixture with the at least one polyolefin.

2. The process according to claim 1, wherein
the depolymerization in step b) is performed in the presence of water, whereby the ε-caprolactam comprising stream is a vapor stream comprising ε-caprolactam and water in a weight to weight ratio of 1:2 to 1:15; and wherein in the extraction in step d)(i) both an aqueous phase and an organic phase are obtained.

3. The process according to claim 2, wherein the water present in step b) is in the form of steam, which is charged to the depolymerization section [B] in step b) as superheated steam having a temperature ranging from 220° C. to 575° C.

4. The process according to claim 1, wherein the organic solvent in step d)(i) is selected from the group consisting of cyclohexane, benzene, toluene, methylene chloride, chloroform, trichloroethane, 4-methyl-2-pentanol, 1-octanol, 2-ethylhexanol and mixtures thereof.

5. The process according to claim 1, wherein the purification of crude & caprolactam to obtain purified ¿-caprolactam in step d) comprises
the step of oxidation with an oxidant in aqueous solution at a temperature ranging from 20° C. to 85° C., wherein the oxidant is selected from the group consisting of potassium permanganate, sodium permanganate and hydrogen peroxide and combinations thereof, and wherein the oxidation is performed in an aqueous solution comprising water and ε-caprolactam in a weight to weight ratio of 5:1 to 1:5; and/or
the step of hydrogenation with a heterogeneous catalyst.

6. The process according to claim 1, wherein the depolymerization of the material derived from nylon 6-containing multi-component material in step b) is carried out in the absence or presence of a catalyst, wherein the catalyst is selected from an acid and a base catalyst, the acid catalyst being selected from the group consisting of orthophosphoric acid, boric acid, sulfuric acid, organic acid, organic sulfonic acid, solid acid, salts of the aforementioned acids, Al2O3 and SiO2, and combinations thereof, and the base catalyst being selected from the group consisting of alkali hydroxide, alkali salt, alkaline earth hydroxide and alkaline earth salts, organic bases and solid bases, and combinations thereof.

7. The process according to claim 1, wherein the solution comprising & caprolactam and impurities from which &-caprolactam is crystallized in step d)(iv) also comprises water.

8. The process according to claim 1, wherein prior to step a) matter comprising nylon 6-containing multi-component material is subjected to a pre-treatment to obtain material derived from nylon 6-containing multi-component material in a pre-treatment section [A].

9. The process according to claim 1, wherein after step d)(i), the organic phase obtained in step d)(i) is washed with water or with an aqueous alkaline solution.

10. The process according to claim 1, wherein the material derived from nylon 6-containing multi-component material is depolymerized at a temperature ranging from 200° C. to 350° C.

11. The process according to claim 1, wherein the material derived from nylon 6-containing multi-component material is depolymerized at a temperature ranging from 220° C. to 340° C.

12. The process according to claim 1, wherein the material derived from nylon 6-containing multi-component material is depolymerized at a temperature ranging from 240° C. to 325° C.

13. The process according to claim 3, wherein the superheated steam has temperature ranging from 275° C. to 500° C.

14. The process according to claim 5, wherein the oxidant is potassium permanganate.

15. The process according to claim 14, wherein the catalyst comprises nickel or palladium.

16. The process according to claim 6, wherein the acid catalyst is orthophosphoric acid.

17. The process according to claim 6, wherein the base catalyst is selected from the group consisting of sodium hydroxide, potassium hydroxide, sodium carbonate, potassium carbonate, sodium hydrogen carbonate, and potassium hydrogen carbonate.

18. The process according to claim 6, wherein the depolymerization in step b) is carried out in the absence of a catalyst or in the presence of orthophosphoric acid.

19. The process according to claim 7, wherein the solution comprising ε-caprolactam and impurities from which ε-caprolactam is crystallized in step d) (iv) comprises more than 1% by weight water.

20. The process according to claim 8, wherein prior to step a) matter comprising nylon 6-containing multi-component material is subjected to a cleaning in cleaning section [α] and/or mechanical size reduction in a mechanical size reduction section [β] and/or a densification section [γ] and an extraction section [ω].

* * * * *